United States Patent
Izumihara et al.

(10) Patent No.: US 12,370,689 B2
(45) Date of Patent: Jul. 29, 2025

(54) MOBILE DEVICE, IMAGING SYSTEM, AND METHOD OF CONTROLLING MOBILE DEVICE

(71) Applicant: SONY GROUP CORPORATION, Tokyo (JP)

(72) Inventors: Atsushi Izumihara, Tokyo (JP); Fumihito Yoshikawa, Tokyo (JP); Koichi Ogasawara, Tokyo (JP); Yuki Endo, Tokyo (JP); Hirofumi Higuchi, Tokyo (JP); Kyouhei Suzuki, Tokyo (JP); Naoki Uchida, Tokyo (JP); Arinobu Ueda, Tokyo (JP); Hiroaki Yokoyama, Tokyo (JP); Tomotsugu Minamikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 21 days.

(21) Appl. No.: 18/044,032

(22) PCT Filed: Sep. 1, 2021

(86) PCT No.: PCT/JP2021/032065
§ 371 (c)(1),
(2) Date: Mar. 3, 2023

(87) PCT Pub. No.: WO2022/054655
PCT Pub. Date: Mar. 17, 2022

(65) Prior Publication Data
US 2024/0261973 A1    Aug. 8, 2024

(30) Foreign Application Priority Data

Sep. 14, 2020  (JP) .................................. 2020-154091

(51) Int. Cl.
| | |
|---|---|
| *B25J 9/16* | (2006.01) |
| *G06T 7/20* | (2017.01) |
| *G06T 7/70* | (2017.01) |
| *G06V 10/141* | (2022.01) |
| *H04N 23/61* | (2023.01) |

(52) U.S. Cl.
CPC ........... *B25J 9/1697* (2013.01); *B25J 9/1664* (2013.01); *G06T 7/20* (2013.01); *G06T 7/70* (2017.01); *G06V 10/141* (2022.01); *H04N 23/61* (2023.01)

(58) Field of Classification Search
CPC ......... B25J 9/1697; B25J 9/1664; G06T 7/20; G06T 7/70; G06V 10/141; H04N 23/61; H04N 5/222; H04N 23/60; G05D 1/02
See application file for complete search history.

(56) References Cited

U.S. PATENT DOCUMENTS

| | | | |
|---|---|---|---|
| 10,694,097 B1 * | 6/2020 | Shirakyan | H04N 23/695 |
| 2015/0294492 A1 * | 10/2015 | Koch | H04N 13/111 |
| | | | 345/426 |

(Continued)

FOREIGN PATENT DOCUMENTS

| | | | | |
|---|---|---|---|---|
| JP | 62-213785 A | | 9/1987 | |
| JP | 2002224980 A | * | 8/2002 | ............. A63H 11/00 |

(Continued)

OTHER PUBLICATIONS

International Search Report and Written Opinion of PCT Application No. PCT/JP2021/032065, issued on Nov. 30, 2021, 15 pages of ISRWO.

*Primary Examiner* — Abby Y Lin
*Assistant Examiner* — Dylan M Katz
(74) *Attorney, Agent, or Firm* — CHIP LAW GROUP

(57) ABSTRACT

There is provided a mobile device that operates in order to image a subject, the mobile device including an imaging unit, a sensor that recognizes a surrounding environment, (Continued)

and a light emitting unit disposed on a housing in a ring shape or on the entire surface of the housing. The operation of the mobile device includes imaging, based on a set photographing plan, with the imaging unit, the subject recognized by the sensor as the mobile device moves. The light emitting unit performs a light emission expression corresponding to at least one of the photographing plan and the operation of the mobile device.

19 Claims, 31 Drawing Sheets

(56) References Cited

U.S. PATENT DOCUMENTS

| | | | |
|---|---|---|---|
| 2018/0229372 A1* | 8/2018 | Breazeal | B25J 11/0015 |
| 2018/0234612 A1* | 8/2018 | Kunkel | H04N 23/62 |
| 2019/0031346 A1* | 1/2019 | Yong | G08G 5/0069 |
| 2019/0104250 A1* | 4/2019 | Sheftel | G05D 1/104 |
| 2021/0304559 A1* | 9/2021 | Cupersmith | H04W 4/025 |

FOREIGN PATENT DOCUMENTS

| | | |
|---|---|---|
| JP | 2009-015441 A | 1/2009 |
| JP | 2016-177640 A | 10/2016 |
| JP | 2017-209736 A | 11/2017 |
| JP | 2019-045724 A | 3/2019 |
| JP | 2020-068426 A | 4/2020 |

\* cited by examiner

MOBILE DEVICE, IMAGING SYSTEM, AND METHOD OF CONTROLLING MOBILE DEVICE

CROSS REFERENCE TO RELATED APPLICATIONS

This application is a U.S. National Phase of International Patent Application No. PCT/JP2021/032065 filed on Sep. 1, 2021, which claims priority benefit of Japanese Patent Application No. JP 2020-154091 filed in the Japan Patent Office on Sep. 14, 2020. Each of the above-referenced applications is hereby incorporated herein by reference in its entirety.

FIELD

The present disclosure relates to a mobile device, a mobile system, and a method of controlling the mobile device.

BACKGROUND

An interactive robot device that performs interaction by language has been proposed (see, for example, Patent Literature 1).

CITATION LIST

Patent Literature

Patent Literature 1: JP 2017-209736 A

SUMMARY

Technical Problem

When a device is used for, for example, photographing of a music event, interaction for moving while avoiding collision with a surrounding environment is necessary. Dialog is difficult in an environment such as a music event and interaction by language is not sufficient.

One aspect of the present disclosure provides a mobile device, an imaging system, and a method of controlling the mobile device capable of improving interaction performance.

Solution to Problem

A mobile device according to one aspect of the present disclosure operates in order to photograph a subject, the mobile device includes: an imaging unit; a sensor that recognizes a surrounding environment; and a light emitting unit disposed on a housing in a ring shape or on an entire surface of the housing, wherein an operation of the mobile device includes imaging, based on a set photographing plan, with the imaging unit, the subject recognized by the sensor as the mobile device moves, and the light emitting unit performs a light emission expression corresponding to at least one of the photographing plan and the operation of the mobile device.

An imaging system according to one aspect of the present disclosure includes: a mobile device that operates in order to photograph a subject; and an operation instruction device that remotely controls the mobile device, wherein the mobile device includes: an imaging unit; and a sensor that recognizes a surrounding environment, and an operation of the mobile device includes imaging, based on a set photographing plan, with the imaging unit, the subject recognized by the sensor as the mobile device moves.

A method of controlling a mobile device according to one aspect of the present disclosure is a method of controlling a mobile device including an imaging unit, a sensor that recognizes a surrounding environment, and a light emitting unit disposed on a housing in a ring shape or on an entire surface of the housing, the method includes controlling the mobile device to image, with the imaging unit, a subject recognized by the sensor as the mobile device moves, and the light emitting unit performs a light emission expression.

BRIEF DESCRIPTION OF DRAWINGS

FIG. 38 is a diagram illustrating an example of a hardware configuration of an operation instruction device or the like.

DESCRIPTION OF EMBODIMENTS

Figure 1:
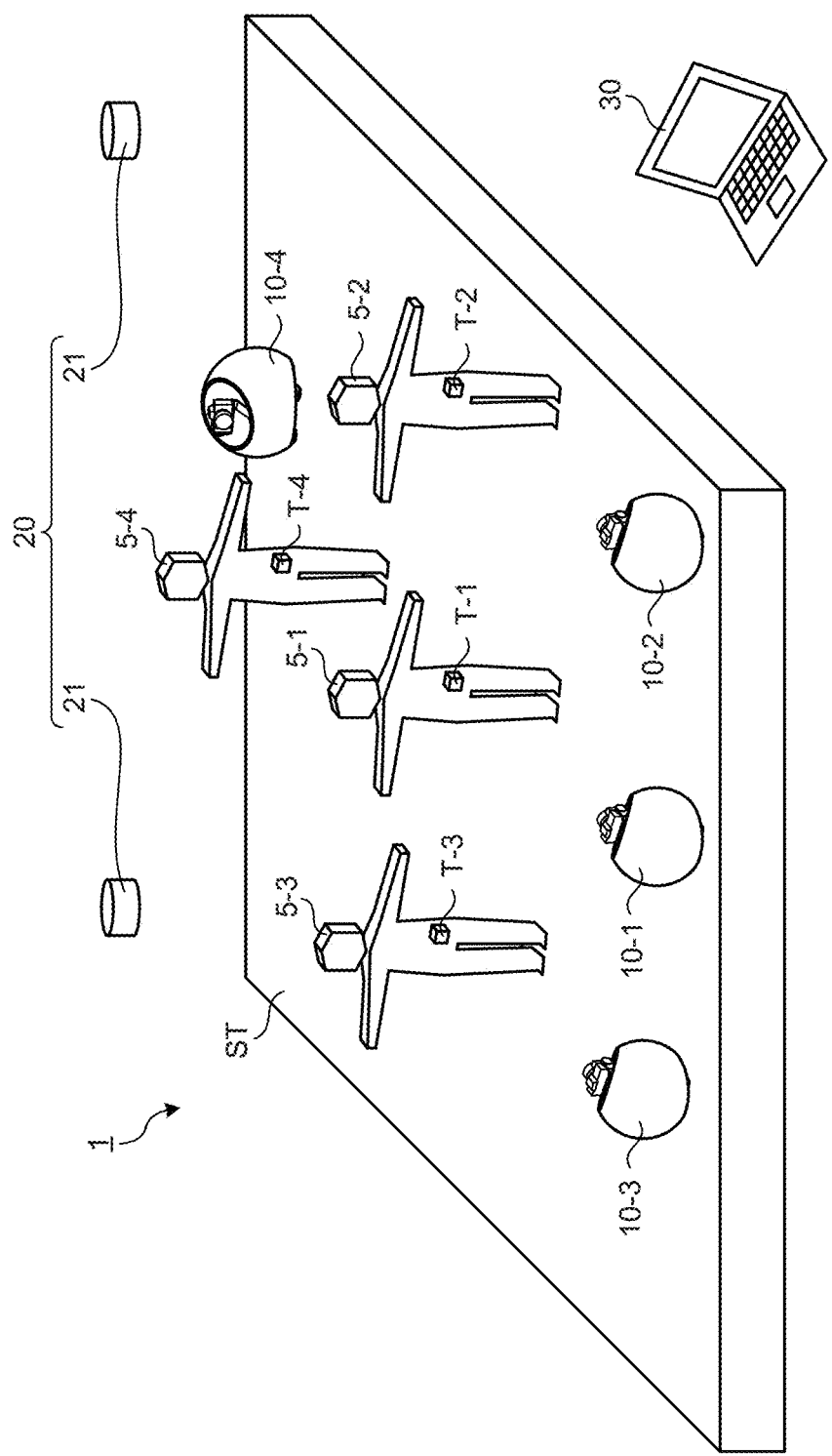
FIG. 1 is a diagram illustrating an example of a schematic configuration of an imaging system according to an embodiment.

An embodiment of the present disclosure is explained in detail below with reference to the drawings. Note that, in the embodiment explained below, redundant explanation is omitted by denoting the same elements with the same reference numerals and signs.

The present disclosure is explained according to order of items described below.

1. Embodiment
1.1 Example of a schematic configuration
1.2 Example of a moving operation and imaging operation
1.3 Example of a light emitting operation
1.4 Example of an illuminating operation
1.5 Example of processing
1.6 Example of an external appearance of a mobile device
1.7 Example of a hardware configuration
2. Effects 1. Embodiment 1.1 Example of a Schematic Configuration FIG. 1 is a diagram illustrating an example of a schematic configuration of an imaging system according to an embodiment. In this example, the imaging system is used for streaming distribution of a music live event. A plurality of performers 5 are performing on a stage ST. The performers 5 are referred to as performer 5-1 and the like such that the performers 5 can be distinguished.

An imaging system 1 includes a mobile device 10, a tag T, an environment-side sensor 20, and an operation instruction device 30. The mobile device 10 may be a plurality of mobile devices 10 and, in this example, the mobile devices 10 as many as the performer 5 are used. The mobile devices 10 are referred to as mobile device 10-1 and the like such that the mobile devices 10 can be distinguished.

The mobile device 10 operates to photograph a subject. The subject is mainly the performer 5 but other objects can be subjects. Since the plurality of mobile devices 10 are present, various combinations of the mobile devices 10 and subjects are possible. The mobile device 10 images the performer 5 while moving. At least a part of the operation of the mobile device 10 is an autonomous operation in which the mobile device 10 automatically operates to perform collision avoidance or the like (obstacle avoidance or the like) with a surrounding environment without requiring a real-time manual operation. The mobile device 10 transmits an imaging result (a video) to the operation instruction device 30 in real time. Further details of the mobile device 10 are explained below.

The tag T is used to acquire position information of the performer 5. The performers 5 have tags T. An example of the tag T is a transmitter that emits a pulse signal, a beacon signal, or the like. The tags T carried by the performers 5 are referred to as tag T-1 and the like and illustrated.

The environment-side sensor 20 recognizes (for example, detects) an environment in which the mobile device 10 is disposed. The recognition of the environment includes recognition of the position of the performer 5. All sensors capable of recognizing the position of the performer 5 may be included in the environment-side sensor 20. In this example, the environment-side sensor 20 recognizes the position of the performer 5 using a sensor group 21. Position information of the performer 5 recognized by the environment-side sensor 20 is transmitted to the operation instruction device 30 in real time. Further details of the environment-side sensor 20 is explained below.

The operation instruction device 30 remotely controls the mobile device 10 and distributes a video in real time. The operation instruction device 30 may be realized using a general-purpose computer and is a laptop computer in this example. A tablet terminal may be used. Further details of the operation instruction device 30 are explained below.

Figure 2:
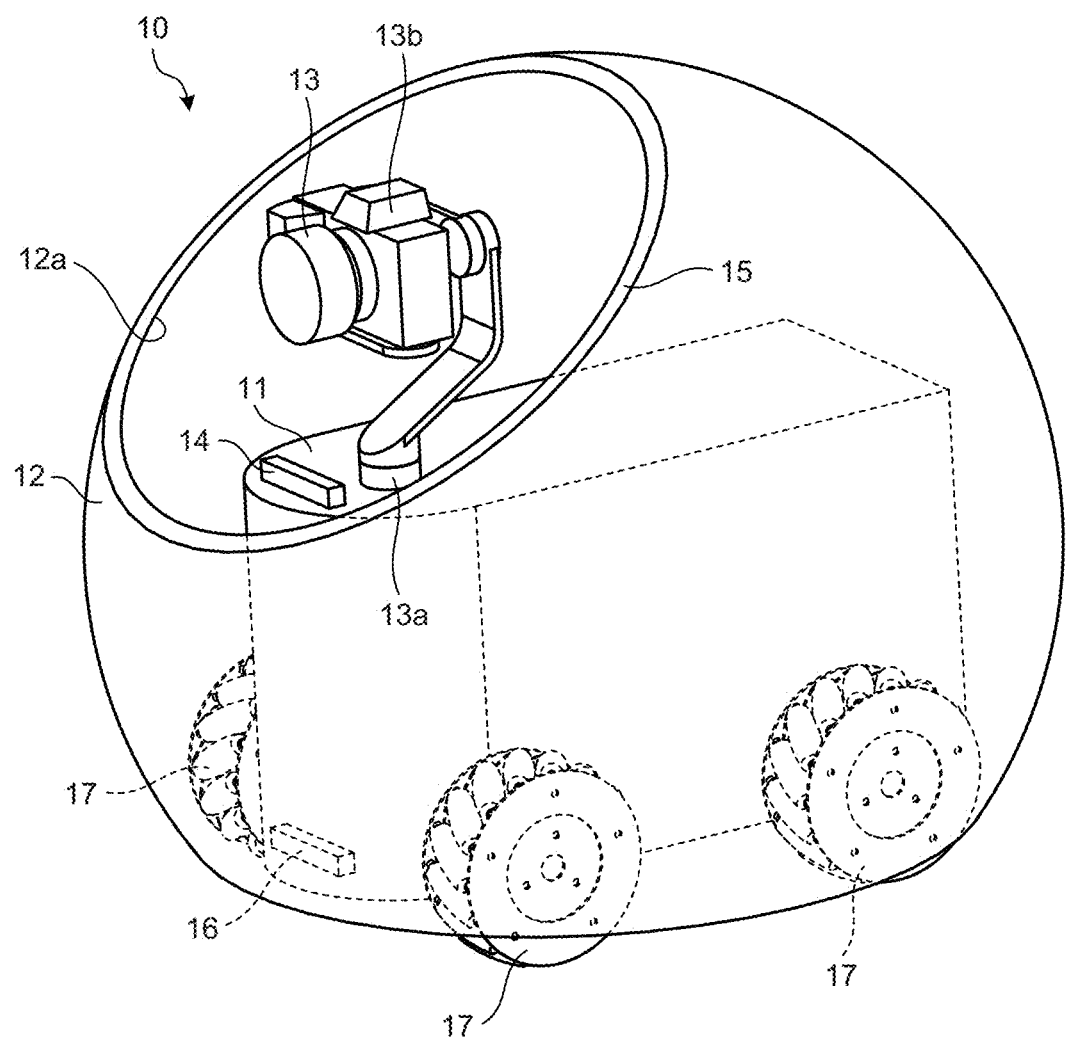
FIG. 2 is a diagram illustrating an example of a schematic configuration of a mobile device.

FIG. 2 is a diagram illustrating an example of a schematic configuration of the mobile device. Among components of the mobile device 10, in particular, a housing 11, a housing 12, an imaging unit 13, a sensor 14, a light emitting unit 15, an illumination unit 16, and a moving mechanism 17 are illustrated with reference numerals. Note that portions hidden behind the housing 12 are drawn by broken lines.

The housing 11 is an inner housing located on the inner side of the housing 12. In this example, among the illustrated components of the mobile device 10, the imaging unit 13, the illumination unit 16, and the moving mechanism 17 are provided in the housing 11. A communication device, a control unit (a control board or the like), a wire, a battery, and the like not illustrated in the figure are housed in the housing 11.

The housing 12 is an outer housing located on the outer side of the housing 11. In this example, among the illustrated components of the mobile device 10, the light emitting unit 15 is provided in the housing 12. The housing 12 may have flexibility, for example, such that impact at the time of collision can be mitigated. A material, thickness, and the like of the housing 12 are selected as appropriately. An opening is formed in an upper part of the housing 12 not to hinder imaging by the imaging unit 13 and recognition by the sensor 14. A portion forming the opening (the edge portion of the opening) is referred to as an opening section 12a and illustrated. The opening section 12a has an annular shape (a ring shape), more specifically, a ring shape. The housing 12 also has an opening in a lower part.

The imaging unit 13 is disposed above the housing 11. The imaging unit 13 is provided on the housing 11 via a neck rotation shaft 13a and a triaxial gimbal 13b such that the position, the direction, and the like can be changed. The imaging unit 13 is, for example, a CCD (Charge Coupled Device) camera and is configured to be capable of controlling parameters. Examples of the parameters include a zoom magnification, a depth of field, and an angle of view.

The sensor 14 is disposed on an upper part of the housing 11. The sensor 14 recognizes a surrounding environment of the mobile device 10. The recognition of the surrounding environment includes recognition of an object present around the mobile device 10. The recognition of the object includes recognition of a type of the object, recognition of the position of the object, and the like. Examples of the type of the object include the performer 5, another mobile device 10, and an obstacle. Examples of the position of the object include a relative position (distance, direction, and the like) of the object with respect to the mobile device 10, the position (coordinates, and the like) of the object on the stage ST, and the like.

All sensors for recognizing the object may be included in the sensor 14. Examples of such sensors include an image sensor and a distance measuring sensor. The imaging unit 13 may also be used as the image sensor.

The sensor 14 also recognizes the position of the mobile device 10. All sensors capable of recognizing the position of the mobile device 10 may be included in the sensor 14. Examples of such sensors include an indoor positioning sensor.

Besides, various sensors for recognizing a moving distance, moving speed, a moving direction, a posture, and the like of the mobile device 10 may be included in the sensor 14. Examples of such sensors include an IMU (Inertial Measurement Unit) sensor, an acceleration sensor, and an angular velocity sensor.

The light emitting unit 15 is provided along the opening section 12a of the housing 12. For example, the light emitting unit 15 is provided on the inner surface (for example, on a cut surface) of the opening section 12a. When the opening section 12a has the ring shape as explained above, the light emitting unit 15 is disposed in a ring shape on the housing 12. Note that the light emitting unit 15 may be disposed on a portion other than the opening section 12a of the housing 12 or may be disposed on the entire surface of the housing 12. An example of the light emitting unit 15 is explained below with reference to FIG. 39 to FIG. 41. An example of a light source of the light emitting unit 15 is a plurality of point light sources disposed along the opening section 12a. An example of the point light source is an LED (Light Emitting Diode). A plurality of point light sources that emit light in different emission colors may be disposed. The light source may be covered with a smoke cover. The light emitting unit 15 performs various light emission expressions. Details of the light emission expressions are explained below.

The illumination unit 16 is provided in a lower part of the housing 11. The illumination unit 16 includes illumination for projection. For example, the illumination unit 16 illuminates the forward and downward direction of the mobile device 10 via an opening formed in a lower part of the housing 12 and performs projection.

The moving mechanism 17 is provided in a lower part of the housing 11. The moving mechanism 17 moves the mobile device 10 in any direction on the stage ST. In the example illustrated in FIG. 2, the moving mechanism 17 is a plurality of rollers. The rollers are incorporated in, for example, a carriage (not illustrated) and come into contact the stage ST through openings formed lower parts of the housing 12. The moving mechanism 17 may be configured to include, for example, a mecanum wheel or the like to enable omnidirectional movement of the mobile device 10. Consequently, the mobile device 10 can come out of a state of being sandwiched by persons without unnecessary rotation or can freely take a position in tangled equipment.

Figure 3:
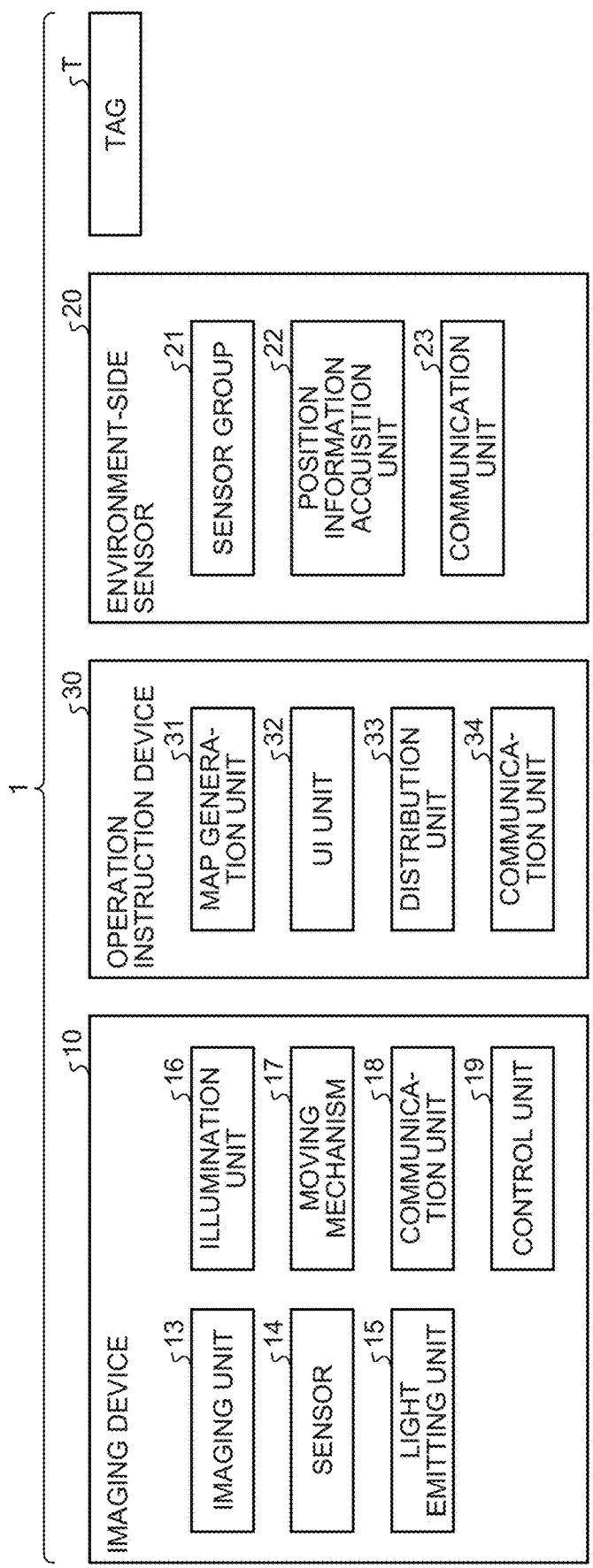
FIG. 3 is a diagram illustrating an example of functional blocks of the imaging system.

FIG. 3 is a diagram illustrating an example of functional blocks of the imaging system. Several representative functional blocks in the mobile device 10, the environment-side sensor 20, and the operation instruction device 30 are illustrated.

The mobile device 10 includes the imaging unit 13, the sensor 14, the light emitting unit 15, the illumination unit 16, the moving mechanism 17, a communication unit 18, and a control unit 19. The housing 11 and the housing 12 in FIG. 2 are not illustrated in FIG. 3. The imaging unit 13, the sensor 14, the light emitting unit 15, the illumination unit 16, and the moving mechanism 17 are as explained above with reference to FIG. 2. The sensor 14 is explained again. The sensor 14 recognizes the position of the performer 5, the position of the mobile device 10, and the like and acquires the positions as position information of the performer 5, position information of the mobile device 10, and the like.

The communication unit 18 transmits and receives information to and from the operation instruction device 30. For the communication, short-range wireless communication such as a wireless LAN may be used. The communication unit 18 transmits a video to the operation instruction device 30 in real time. The communication unit 18 transmits a recognition result of the sensor 14, in particular, the position information of the performer 5 and the position information of the mobile device 10 to the operation instruction device 30 in real time.

The control unit 19 controls the operation of the mobile device 10 by controlling the elements of the mobile device 10. The operation of the mobile device 10 includes a moving operation, an imaging operation, a light emitting operation, and an illuminating operation. The control of the moving operation includes control of a moving direction, moving speed, and the like of the mobile device 10. The control of the imaging operation includes control of the direction of the imaging unit 13 (the of the camera), parameters, and the like. The control of the light emitting operation includes control of the light emission expression performed by the light emitting unit 15. The control of the illuminating operation includes control of projection performed by the illumination unit 16.

In one embodiment, the control unit 19 controls the operation of the mobile device 10 based on a set photographing plan. The photographing plan defines the operation of the mobile device 10. The photographing plan may be set before performance of the performer 5 starts or may be set while the performance is performed. In the latter case, the photographing plan may be changed (for example, updated) at any time. The photographing plan is set by the operation instruction device 30 as explained below.

The photographing plan may define the operations of the plurality of mobile devices 10. Since the operations of the mobile devices 10 are defined such that the mobile devices 10 operate in conjunction with one another, the plurality of mobile devices 10 operates in cooperation.

The control unit 19 controls, based on the set photographing plan, the operation (the moving operation and imaging operation) of the mobile device 10 such that the moving mechanism 17 moves the mobile device 10 and the imaging unit 13 images the performer 5 recognized by the sensor 14. At least a part of the operation of the mobile device 10 is an autonomous operation. The control unit 19 automatically controls the operation of the mobile device 10 to achieve the photographing plan.

Based on or instead of the photographing plan, the control unit 19 may control each of the moving operation, the imaging operation, the light emitting operation, and the illuminating operation according to other operations. For example, the control unit 19 causes the light emitting unit 15 to perform light emission expressions corresponding to the moving operation, the imaging operation, the illuminating operation, and the like or causes the illumination unit 16 to perform projections corresponding to the moving operation, the imaging operation, the light emitting operation, and the like.

A specific example of the control of the operation of the mobile device 10 by the control unit 19 is explained below again with reference to FIG. 4 and subsequent figures.

The tag T is as explained above with reference to FIG. 1. Therefore, the explanation thereof is not repeated here.

The environment-side sensor 20 includes the sensor group 21, a position information acquisition unit 22, and a communication unit 23.

The sensor group 21 is a plurality of sensors respectively synchronized in timing by cable connection or the like. The sensors may be receivers that receive a transmission signal of the tag T.

The position information acquisition unit 22 recognizes the distance and the direction to the tag T from the transmission signal of the tag T received by the sensors of the sensor group 21. Since the positions of the sensor group 21 are known, the position of the tag T and the position of the performer 5 having the tag T are recognized. Various publicly-known methods may be used for recognition. Detailed explanation of the methods is omitted here. The position information acquisition unit 22 acquires the recognized position of performer 5 as position information of the performer 5.

The communication unit 23 transmits the position information acquired by the position information acquisition unit 22 to the operation instruction device 30 in real time.

Note that the position information acquired by the position information acquisition unit 22 may be transmitted to the mobile device 10 via the operation instruction device 30 or directly from the environment-side sensor 20. For example, when the mobile device 10 has not yet recognized the position of the performer 5, the position information from the environment-side sensor 20 may be used as a reference.

The operation instruction device 30 includes a map generation unit 31, a UI unit 32, a distribution unit 33, and a communication unit 34.

The map generation unit 31 generates a map indicating the position of the mobile device 10 and the position of the performer 5 in real time. The map also includes topographical information (the stage ST in the example illustrated in FIG. 1). The position of the mobile device 10 is acquired as position information transmitted by the mobile device 10. The position of the performer 5 is obtained as position information transmitted by the mobile device 10 and the environment-side sensor 20. Note that, even when the mobile device 10 does not recognize the position of the performer 5, the position information transmitted by the environment-side sensor 20 is present. Therefore, the position information of the performer 5 can be reliably obtained. The map generated by integrating the position information from the mobile device 10 and the environment-side sensor 20 can also be referred to as integrated map.

The UI unit 32 provides a user interface that performs information presentation to a user and reception of user operation. The UI unit 32 may perform the information presentation and the reception of the user operation while displaying the map generated by the map generation unit 31. The UI unit 32 includes, for example, a display and an operation panel (which may be a touch panel or the like). Besides, an operation lever, a fader, and the like may be included in the UI unit 32. Several examples of use of the UI unit 32 by the user are explained.

For example, the user sets a photographing plan using the UI unit 32 that displays a map. The set photographing plan is transmitted to the mobile device 10 and the mobile device 10 operates based on the photographing plan. As described above, the map is an integrated map generated by integrating the position information from the mobile device 10 and the environment-side sensor 20. By setting the photographing plan using the UI unit 32 that displays such a map, the mobile device 10 operates based on a recognition result of the sensor 14 of the mobile device 10 and a recognition result of the environment-side sensor 20. Consequently, for example, operation accuracy of the mobile device 10 can be improved compared with when the mobile device 10 operates based on only the recognition result of 14 of the mobile device 10.

As explained above, the photographing plan may be updated and, in that case, information concerning update or the like (for example, the updated photographing plan) is transmitted to the mobile device 10 such that, for example, the update of the photographing plan is reflected in the operation of the mobile device 10 in real time.

For example, the user manually instructs the operation of the mobile device 10 using the UI unit 32. This enables manual operation of the mobile device 10. Examples of the instruction include panning, tilting, and zooming of the imaging unit 13 of the mobile device 10 and adjustment of the moving speed of the mobile device 10. The instruction is transmitted to the mobile device 10 and the mobile device 10 operates according to the instruction in real time.

For example, the user performs, for example, selection of a video using the UI unit 32. A video to be used for distribution or the like is selected out of videos obtained from the respective plurality of mobile devices 10.

The distribution unit 33 distributes the video. The distribution may be live streaming distribution. For example, the distribution unit 33 distributes the video by transmitting the video to a distribution server not illustrated.

The communication unit 34 transmits and receives information to and from the mobile device 10, the environment-side sensor 20, and the like. Examples of the information include the position information, the photographing plan, the instruction of the manual operation, and the video explained above.

1.2 Example of a Moving Operation and Imaging Operation

The mobile device 10 is explained again. As explained above, the control unit 19 of the mobile device 10 controls the operation of the mobile device 10. Some examples of the moving operation and the imaging operation (movement by the moving mechanism 17 and imaging by the imaging unit 13) are explained with reference to FIG. 4 to FIG. 9 together with an example of setting of a photographing plan that defines the operations.

Figure 4:
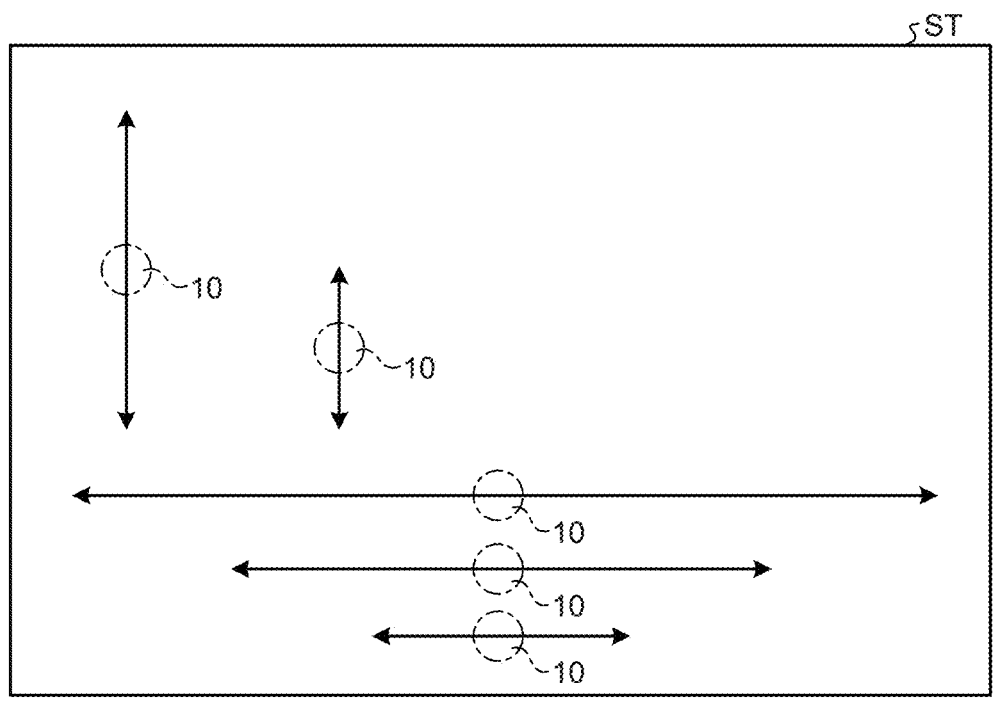
FIG. 4 is a diagram illustrating an example of a moving operation and/or an imaging operation.

In an example illustrated in FIG. 4, the control unit 19 moves the mobile device 10 along a set virtual route (a virtual rail). FIG. 4 illustrates an example of setting of a photographing plan that defines such an operation of the mobile device 10. The user sets a virtual route on the stage ST using the UI unit 32 that displays a map illustrated in FIG. 4. For example, a plurality of virtual routes having different directions and lengths as indicated by an alternate long and short dash line arrow can be set. The plurality of mobile devices 10 and the plurality of virtual routes may be set in various combinations.

Moving speed and a moving pattern may be set together with the virtual route. The moving speed may be set to be different according to positions on the virtual route. Examples of the moving pattern include one-way movement and reciprocating movement. Default setting such as reciprocation at a constant speed may be performed.

Speaking of a manual operation, during the operation of the mobile device 10, the mobile device 10 can be immediately moved by designating a position on the virtual route or can be put on standby at a moving destination.

Figure 5:
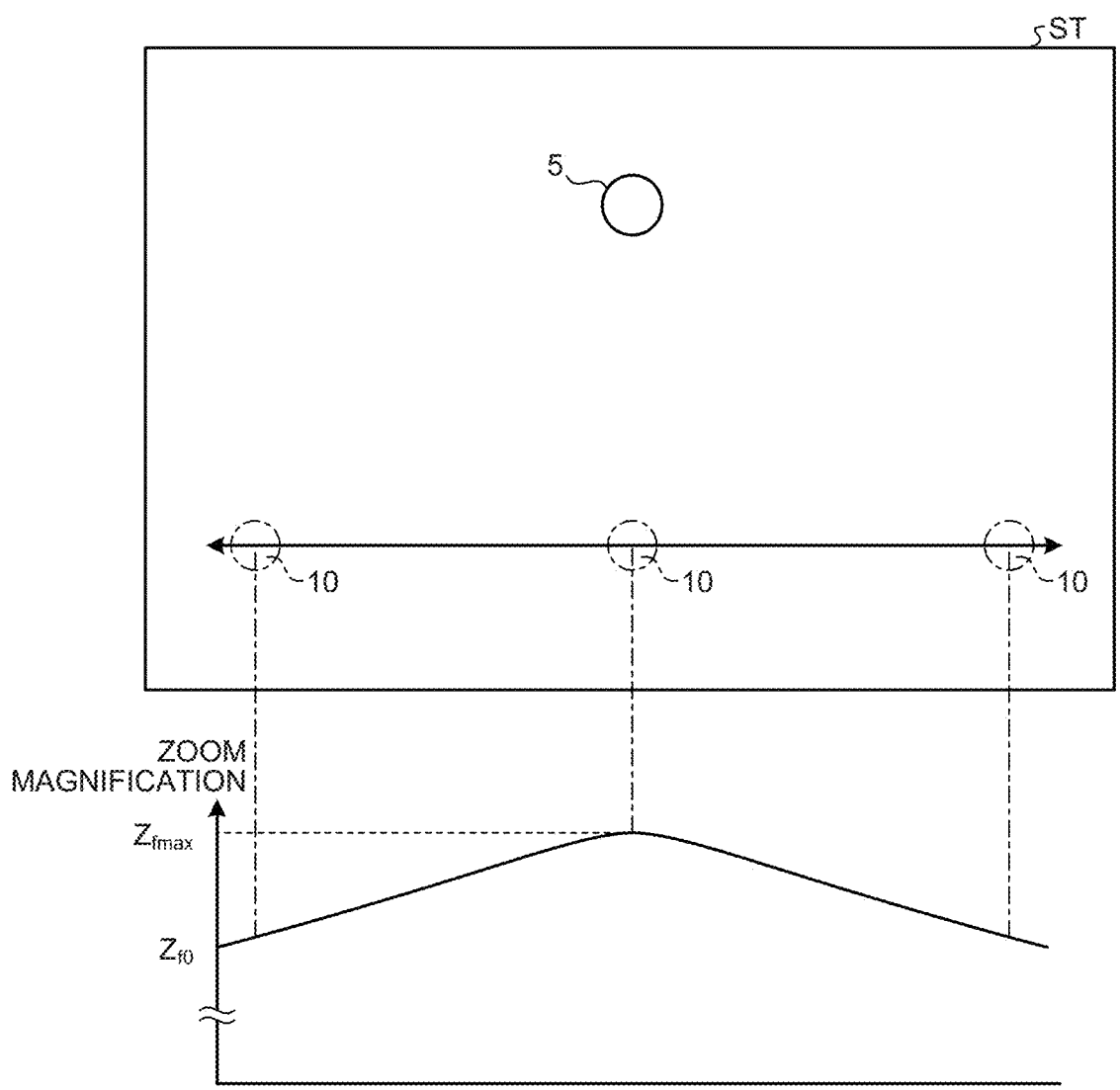
FIG. 5 is a diagram illustrating an example of a moving operation and/or an imaging operation.

In an example illustrated in FIG. 5, the control unit 19 changes imaging parameters according to the movement of the mobile device 10. FIG. 5 illustrates an example of setting of a photographing plan that defines such an operation of the mobile device 10. As the imaging parameters, zoom magnification is illustrated. The user sets zoom magnification corresponding to the position of the mobile device 10 on the virtual route using the UI unit 32 that displays an illustrated map. In this example, zoom magnification at the time when the mobile device 10 is most distant from the performer 5 is a reference value $Z_{f0}$ and zoom magnification at the time when the mobile device 10 approaches to the performer 5 most is a maximum value $Z_{fmax}$. As the mobile device 10 approaches the performer 5, the zoom magnification increases. However, a changing form of the zoom magnification is not limited to this example. For example, the zoom magnification may continue to increase or decrease as the mobile device 10 moves from one end to the other end of the virtual route.

Figure 6:
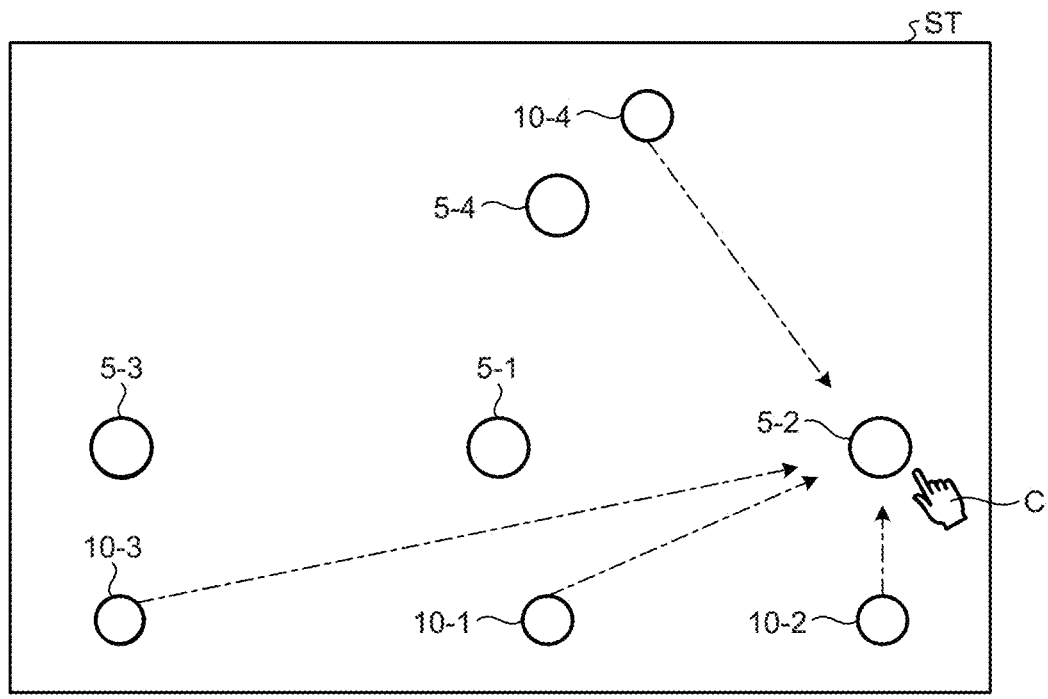
FIG. 6 is a diagram illustrating an example of a moving operation and/or an imaging operation.

In an example illustrated in FIG. 6, the control unit 19 causes the mobile device 10 to image a designated performer 5. FIG. 6 illustrates an example of setting of a photographing plan that defines such an operation of the mobile device 10. The user designates a performer 5-2 among the plurality of performers 5 a cursor C using the UI unit 32 that displays an illustrated map. The mobile devices 10 images the designated performer 5-2 while changing a direction to fit the designated performer 5-2 in, for example, the center of an angle of view. Imaging directions of the mobile devices 10 are schematically indicated by alternate long and short dash line arrows. Note that, without being limited to the performer 5, any place on the stage ST may be designated.

Figure 7:
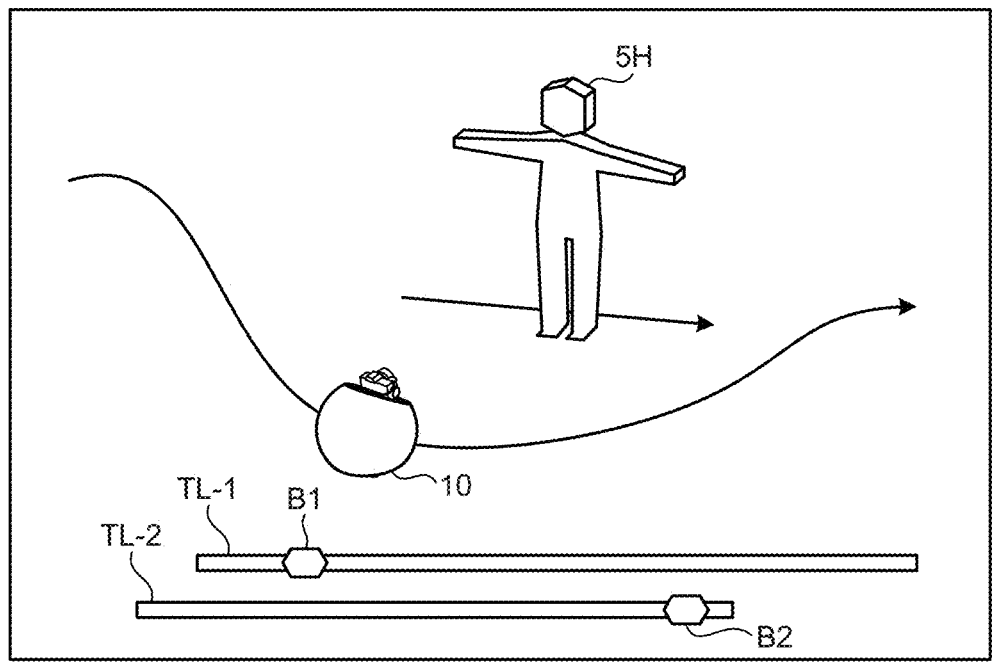
FIG. 7 is a diagram illustrating an example of a moving operation and/or an imaging operation.

In an example illustrated in FIG. 7, the control unit 19 causes the mobile device 10 to operate according to performance (a song, music, and the like). FIG. 7 illustrates an example of setting of a photographing plan that defines such an operation of the mobile device 10. The user sets an operation of the mobile device 10 with respect to the performance of a virtual performer 5H using the UI unit 32 that displays an illustrated map (in this example, a map of a three-dimensional expression). The performer 5H performs planed performance of the performer 5. In this example, the performance of performer 5H is represented by a timeline TL1. The operation of the mobile device 10 is represented by a timeline TL2. The timeline TL1 and the timeline TL2 are WayPoint rows representing time, position, speed, direction, and the like. Any timing in the timeline TL1 can be selected by a bar B1. Any timing in the timeline TL2 can be selected by a bar B2. By defining the operation of the mobile device 10 represented in the timeline TL2 according to the performance of the performer 5H represented in the timeline TL1, the operation is linked with the performance (synchronized with tune, staging, and the like).

When the user tries to set an unrealizable operation, the UI unit 32 may perform error display or propose an operation corrected to be realizable. Examples of the unrealizable operation include an operation of passing a place where the mobile device 10 cannot move and an operation requiring operation speed that requires movement at speed exceeding maximum moving speed of the mobile device 10.

Note that the operation of performer 5 during actual photographing sometimes deviates from a motion of the performer 5H. In that case, for example, the mobile device 10 may perform, for example, by an amount of the deviation of the operation, an operation different from the operation defined by the timeline TL2.

Figure 8:
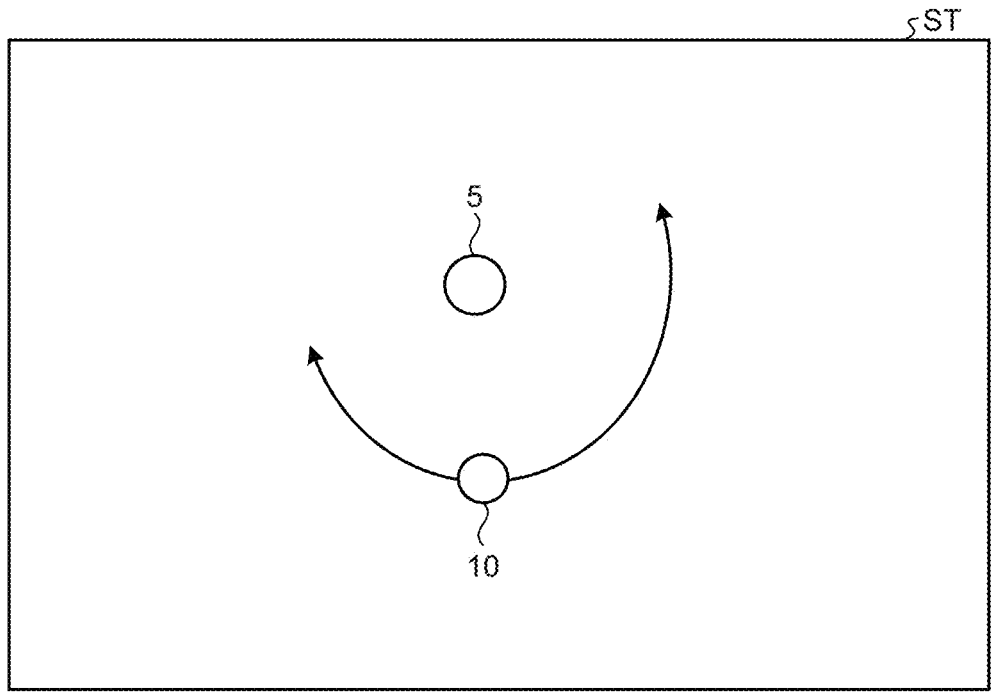
FIG. 8 is a diagram illustrating an example of a moving operation and/or an imaging operation.

In an example illustrated in FIG. 8, the control unit 19 causes the mobile device 10 to rotationally move (spin-move) with respect to the performer 5. FIG. 8 illustrates an example of setting of a photographing plan that defines such an operation of the mobile device 10. The user designates the performer 5 to be imaged and sets a distance, a rotation range (an angular range), and the like with respect to the performer 5 using the UI unit 32 that displays an illustrated map. The mobile device 10 images the performer 5 while rotationally moving in the set distance and the set rotation range centering on the designated performer 5. The distance and the rotation range may be set by default.

When the user tries to set an unrealizable rotational movement, the UI unit 32 may perform error display or propose a rotational movement corrected to be realizable. Examples of the unrealizable rotational movement include a rotational movement with respect to the performer 5 who is playing a drum in a place having a step.

Figure 9:
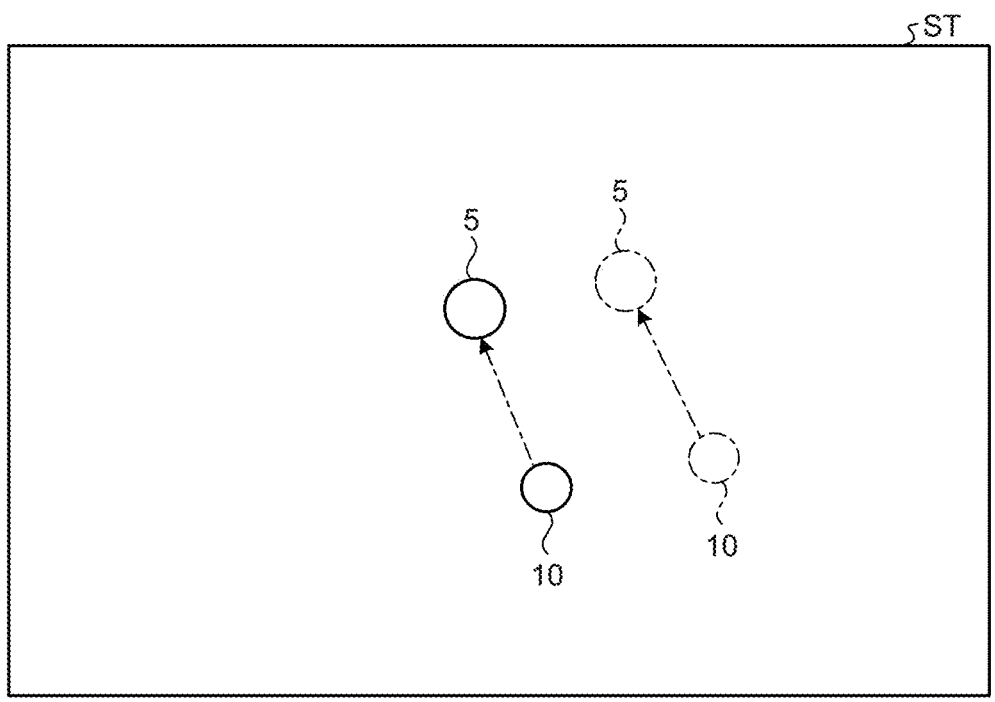
FIG. 9 is a diagram illustrating an example of a moving operation and/or an imaging operation.

In an example illustrated in FIG. 9, the control unit 19 causes the mobile device 10 to track and image the performer 5. FIG. 9 illustrates an example of setting of a photographing plan that defines such an operation of the mobile device 10. The user designates the performer 5 using the UI unit 32 that displays an illustrated map. The mobile device 10 tracks the designated performer 5 and continues to image the performer 5. For example, when the performer 5 moves to a position indicated by a white circle of an alternate long and short dash like, the mobile device 10 moves together. Arrows schematically indicate imaging directions of the mobile devices 10.

In the tracking photographing, the mobile device 10 may move to maintain a distance and a direction (a relative position) with respect to the performer 5. The mobile device 10 may move to change the direction while maintaining the distance to the performer 5. By changing the direction, a staging effect such as a purling noise can be obtained. The composition of imaging such as which part of the performer 5 is imaged may also be changed as appropriate during the tracking photographing. The mobile device 10 may image the performer 5 while moving in parallel to the performer 5 or moving preceding the performer 5. Such photographing by the parallel running and the preceding movement is also a form of the tracking photographing.

A photographing plan combining all operations including the moving operation and the imaging operation explained above may be set. For example, it is also possible to set a photographing plan (programmable rail photographing) in which the mobile device 10 changes the direction to track the performer 5 while moving on the virtual route at designated speed and performs imaging.

When the plurality of mobile devices 10 simultaneously perform imaging, the control unit 19 may control the operation of the mobile device 10 not to image the other mobile devices 10.

Figure 10:
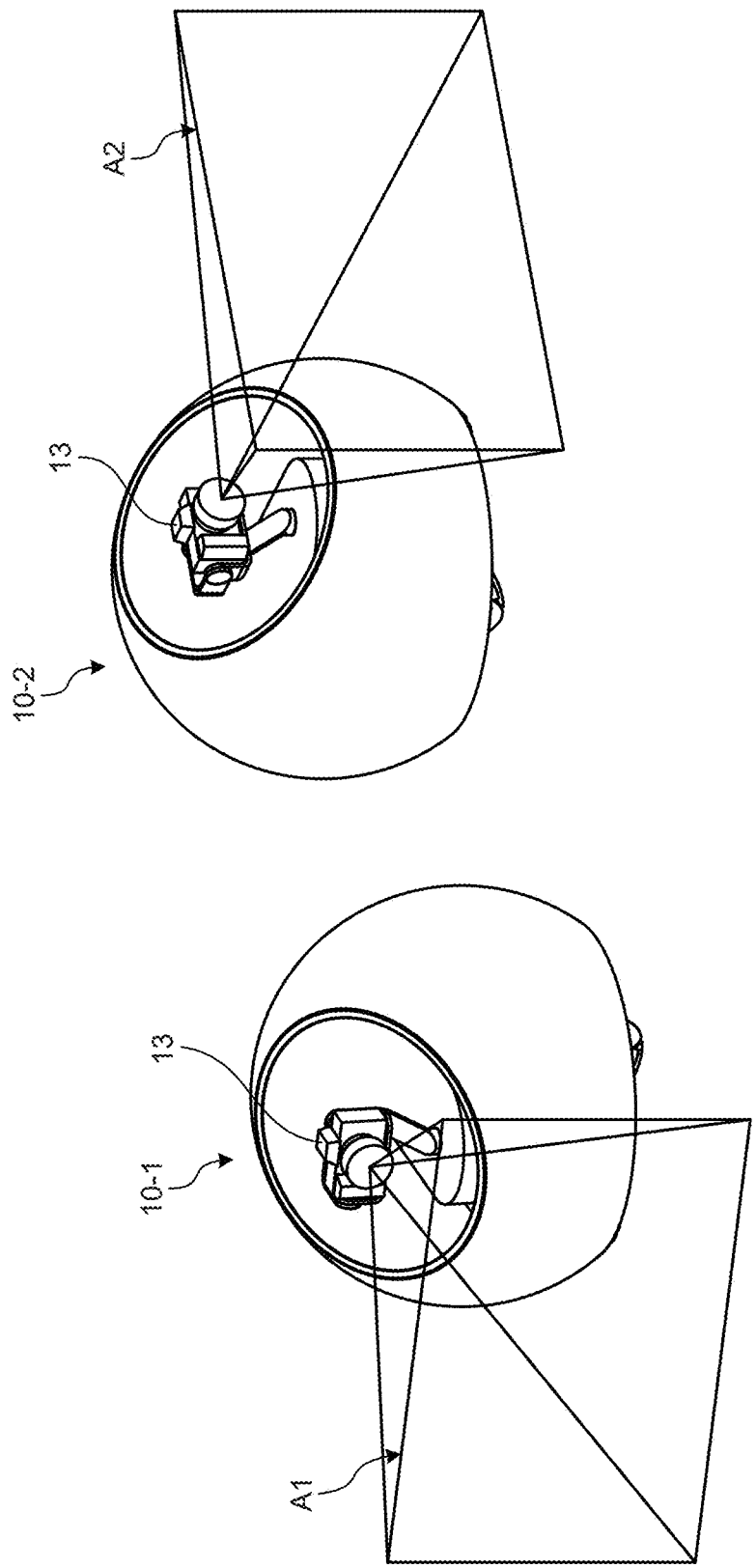
FIG. 10 is a diagram illustrating an example of imaging ranges of a plurality of mobile devices.

FIG. 10 is a diagram illustrating an example of imaging ranges of the plurality of mobile devices. In this example, the mobile device 10-1 and the mobile device 10-2 are simultaneously performing imaging. By recognizing the position of the mobile device 10-2, the mobile device 10-1 operates such that the mobile device 10-2 is not included in an imaging range A1 of the imaging unit 13. By recognizing the position of the mobile device 10-1, the mobile device 10-2 operates such that the mobile device 10-1 is not included in an imaging range A2 of the imaging unit 13.

With the mobile device 10 that performs the moving operation and the imaging operation explained above, for example, the movement and imaging can be performed even if an actual rail such as a conventional dolly device is absent. Therefore, introduction cost is reduced.

Since the mobile device 10 operates (including autonomous operation) only by setting the photographing plan, the burden of manual operation is also reduced. For example, the user only has to perform moving speed adjustment for the mobile device 10 and designation of a tracking photographing target with manual operation at a start time of performance. The manual adjustment of the moving speed may be performed only by registering and calling moving speed checked in rehearsal or the like.

In addition to the manual operations explained above at the start time of the performance, manual operations may be intervened during the performance. For example, the mobile device 10 is put on standby at the end of the virtual route by the manual operation. The mobile device 10 may be moved at timing when the performance becomes relatively exciting (for example, at a high point of a song). The mobile device 10 may be decelerated at timing when the performance becomes relatively slow. The mobile device 10 may be accelerated at timing when the performance becomes exciting again. In addition, nuance formation of a composition of imaging including manual operation such as zooming and panning may also be performed by the manual operation.

Besides, it is also possible to perform manual operation for putting the mobile device 10 standby at the end of the stage ST and performing imaging by the mobile device 10 only at desired timing.

1.3 Example of a Light Emitting Operation

As explained above, the light emitting operation (light emission expression performed by the light emitting unit 15) of the mobile device 10 is performed according to the photographing plan or is performed according to the moving operation, the imaging operation, the illuminating operation, or the like. Several examples thereof are explained with reference to FIG. 11 to FIG. 18.

Figure 11:
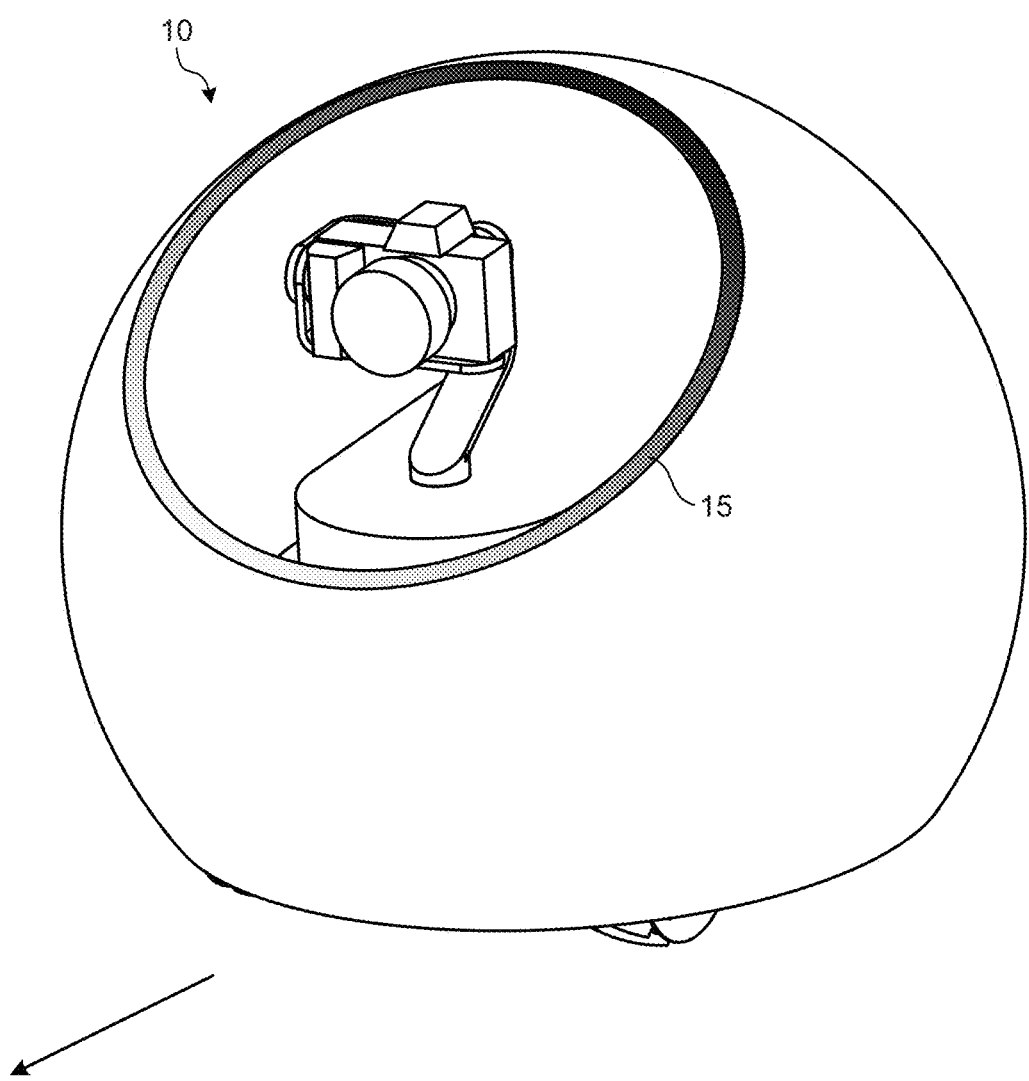
FIG. 11 is a diagram illustrating an example of a light emitting operation.
Figure 12:
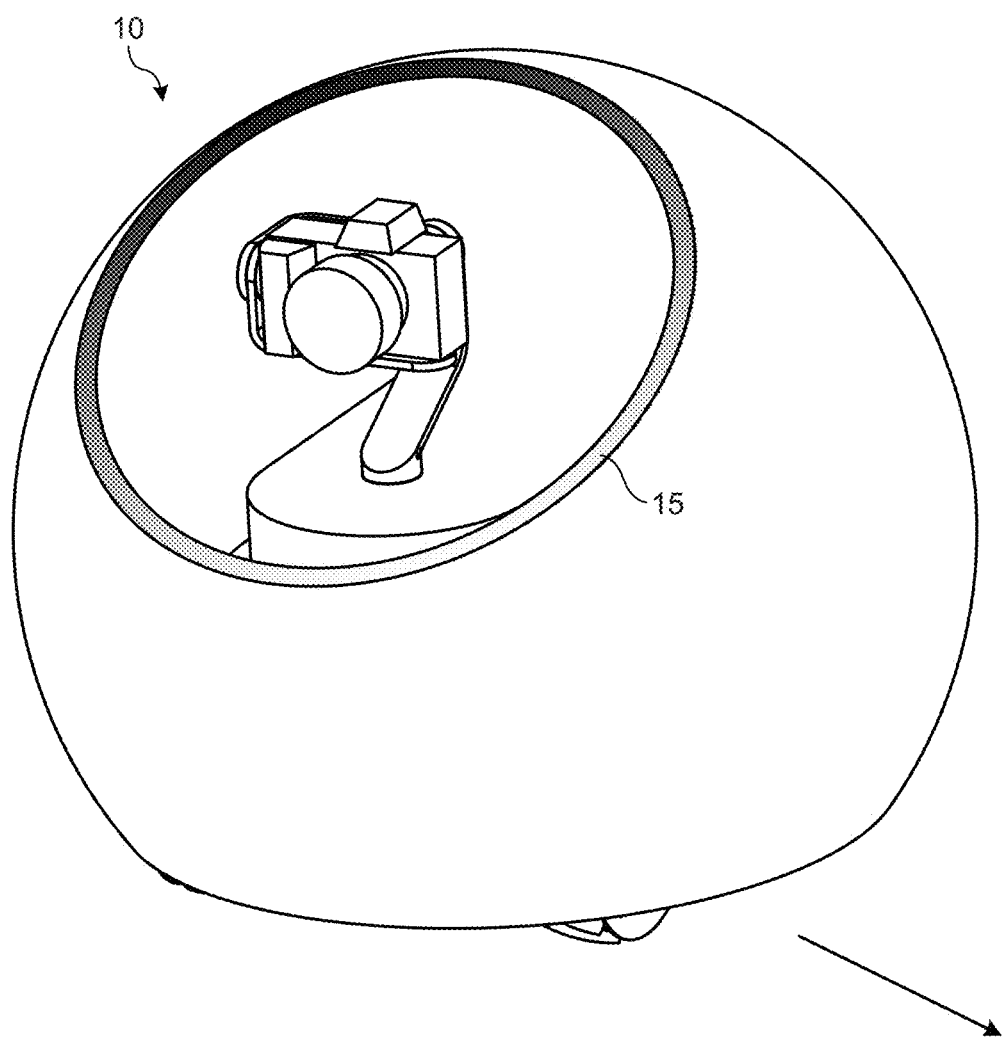
FIG. 12 is a diagram illustrating an example of a light emitting operation.

In examples illustrated in FIG. 11 and FIG. 12, the control unit 19 changes a light emission direction of the light emitting unit 15. As illustrated in FIG. 11, when the mobile device 10 moves forward in an arrow direction, a front portion of the light emitting unit 15 mainly emits light. As illustrated in FIG. 12, when the mobile device 10 moves laterally, a lateral portion of the light emitting unit 15 mainly emits light. Without being limited to presence or absence of light emission, a change in the light emission direction may be represented by a change in a light emission color, a change in a light emission amount (luminance), or the like.

Figure 13:
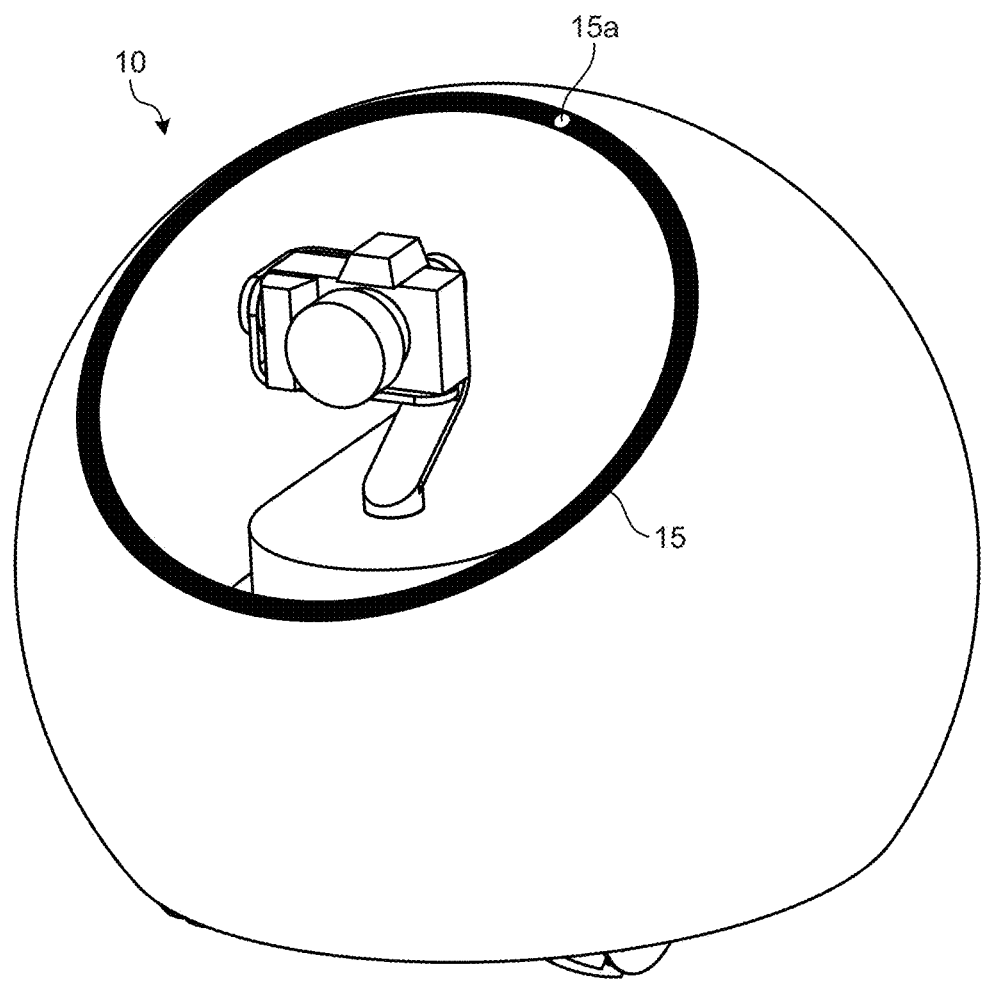
FIG. 13 is a diagram illustrating an example of a light emitting operation.
Figure 14:
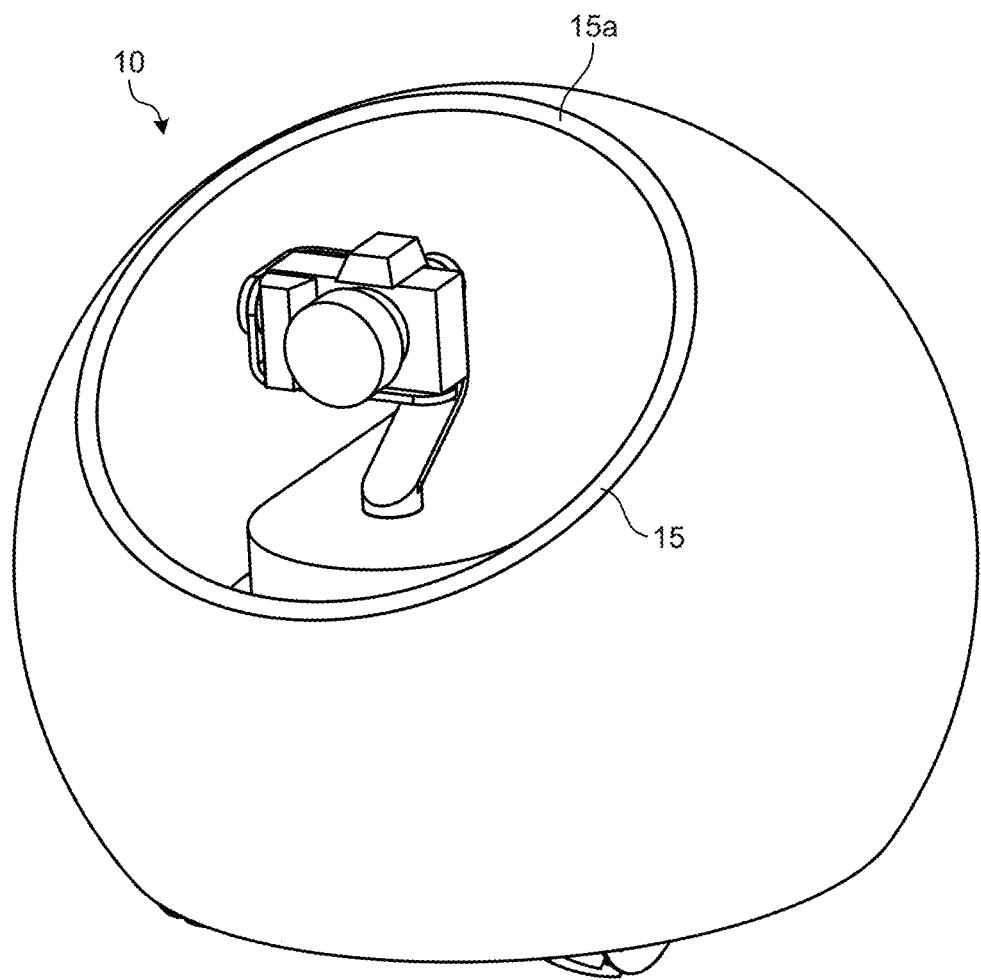
FIG. 14 is a diagram illustrating an example of a light emitting operation.

In examples illustrated in FIG. 13 and FIG. 14, the control unit 19 causes the light emitting unit 15 to perform flashing expression. Specifically, a portion 15a of the light emitting unit 15 repeats a light emitting state and a non-light emitting state. For example, red flashing may express that the mobile device 10 is in a state of performing imaging (a REC state).

Figure 15:
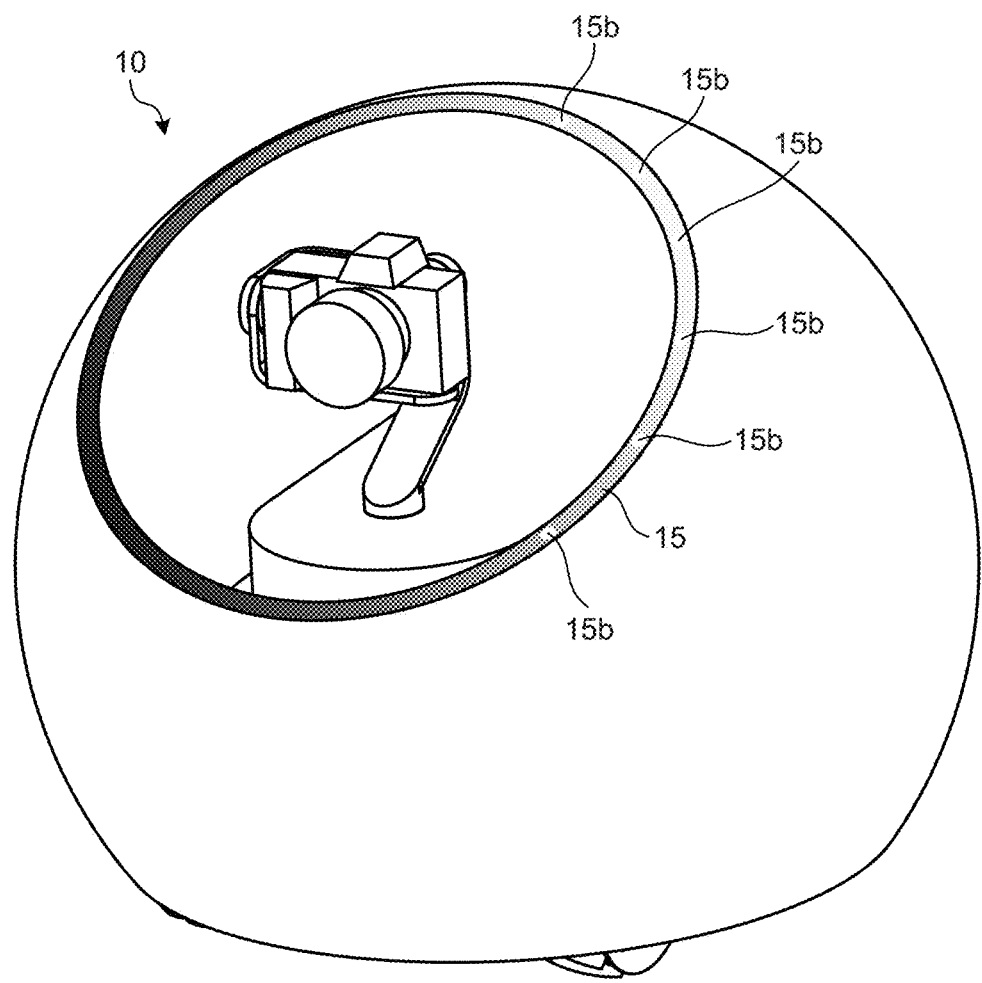
FIG. 15 is a diagram illustrating an example of a light emitting operation.
Figure 16:
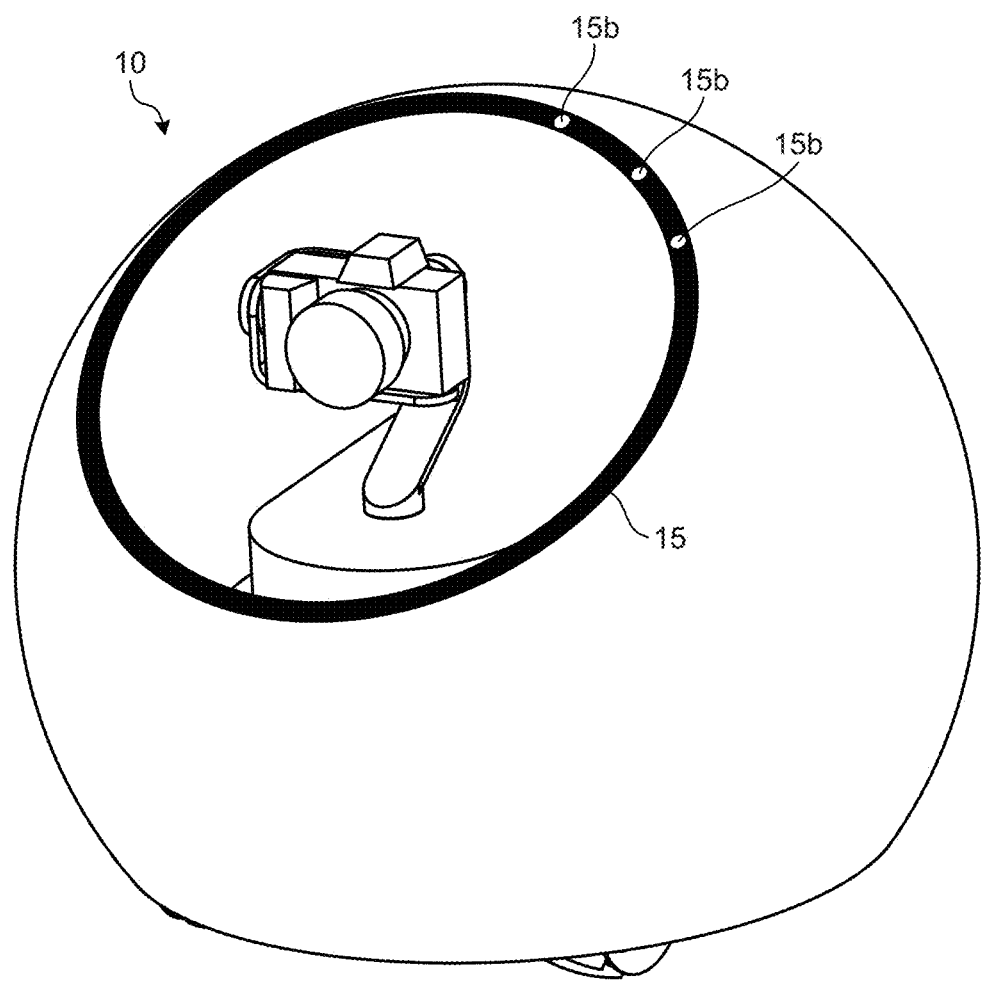
FIG. 16 is a diagram illustrating an example of a light emitting operation.

In examples illustrated in FIG. 15 and FIG. 16, the control unit 19 causes the light emitting unit 15 to perform countdown expression. The countdown light emission includes a change in light emission from immediately before a time point of a start or an end of a predetermined operation (a moving operation, an imaging operation, or the like) of the mobile device 10 to a time point of the start or the end. Specifically, several portions 15b of the light emitting unit 15 and portions among the portions emit light as illustrated in FIG. 15 and the light emitting portions decrease as time passes as illustrated in FIG. 16.

Figure 17:
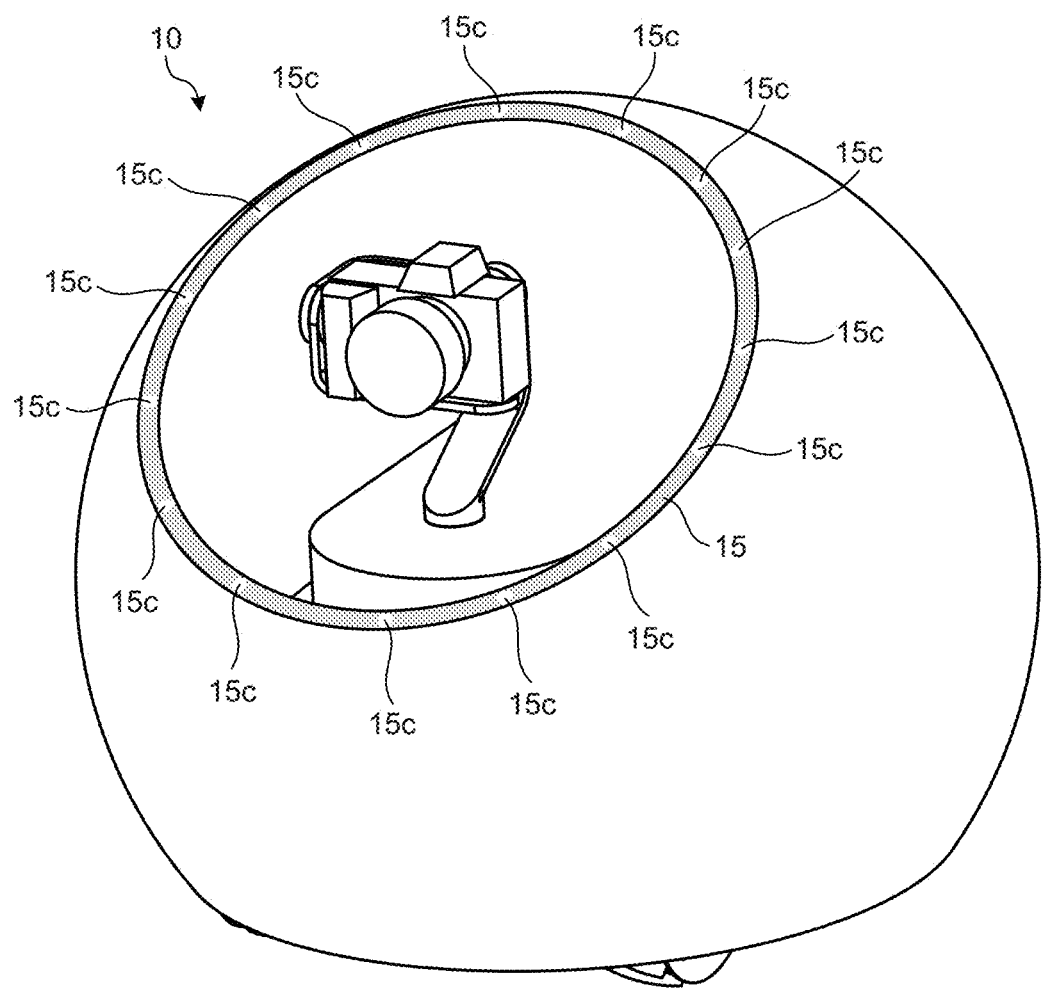
FIG. 17 is a diagram illustrating an example of a light emitting operation.

In an example illustrated in FIG. 17, the control unit 19 causes the entire light emitting unit 15 to emit light. Specifically, the entire light emitting unit 15 emits light and several portions 15c emit light in a mode different from modes of the other portions (a different light emission color, a light emission amount, and the like). In the entire light emission, the light emission amount may be increased at timing when the light is highlighted and the light emission amount may be reduced at timing when the light is not highlighted (timing when the light becomes dark).

Figure 18:
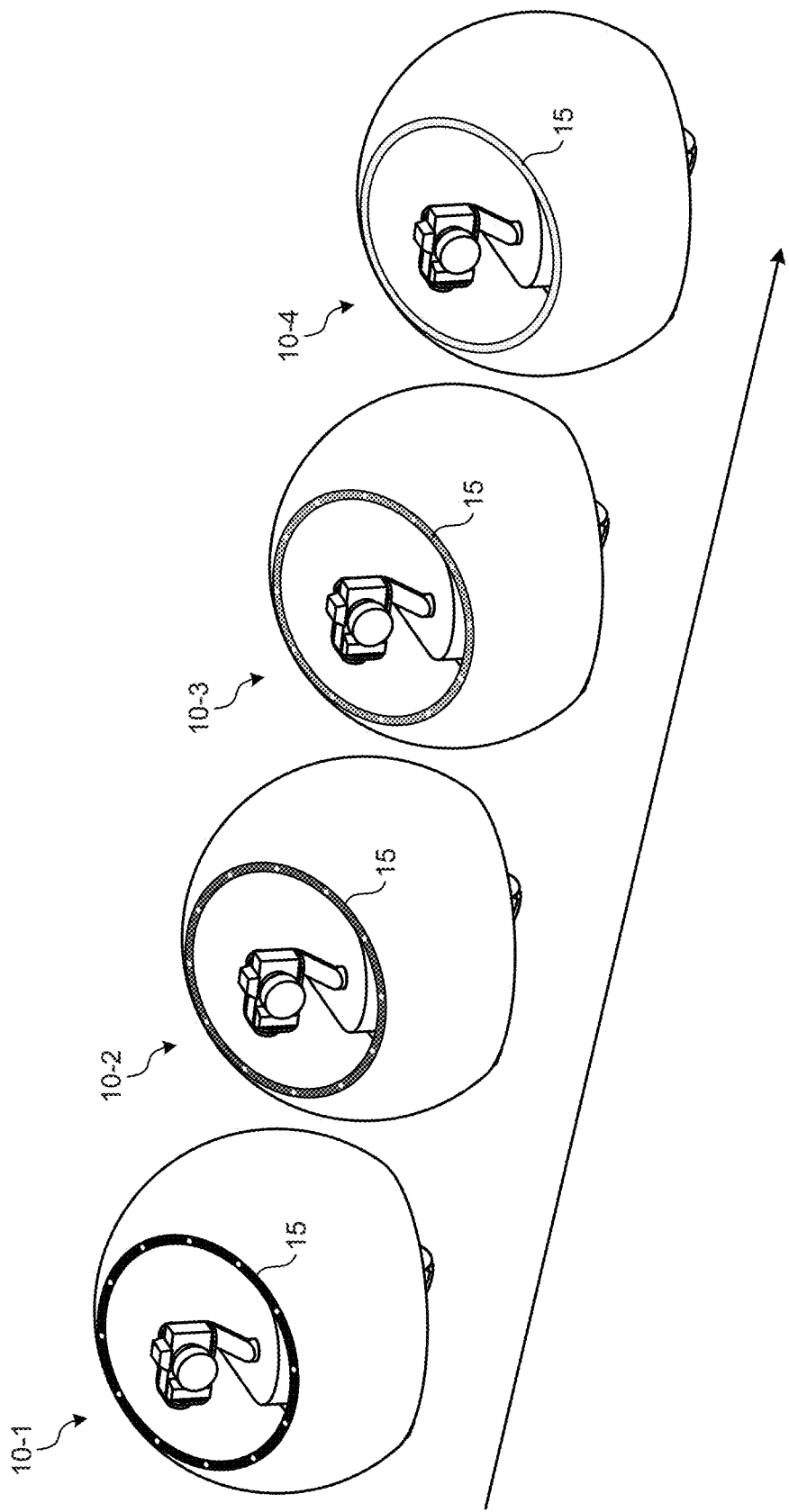
FIG. 18 is a diagram illustrating an example of a light emitting operation.

In an example illustrated in FIG. 18, the control unit 19 causes the light emitting unit 15 to emit light in cooperation with light emission of the other mobile devices 10. Specifically, as indicated by arrow, the mobile device 10-1, the mobile device 10-2, the mobile device 10-3, and the mobile device 10-4 emit light in order in cooperation (association) to realize wave expression.

The light emitting operation explained above is not only performed together with the movement and the imaging of the mobile device 10 but may be incorporated into performance. For example, the mobile device 10 performs luminous expression while moving according to the movement of the performer 5 to form a part of the performance. The mobile device 10 may also perform imaging while forming a part of the performance.

The photographing plan for defining the light emitting operation explained above may also be set using, for example, the UI unit 32 that displays a map.

1.4 Example of an Illuminating Operation

As described above, the illuminating operation (projection performed by the illumination unit 16) of the mobile device 10 is performed according to a photographing plan or is performed according to a moving operation, an imaging operation, a light emitting operation, or the like. Several examples thereof are explained with reference to FIG. 19 to FIG. 22.

Figure 19:
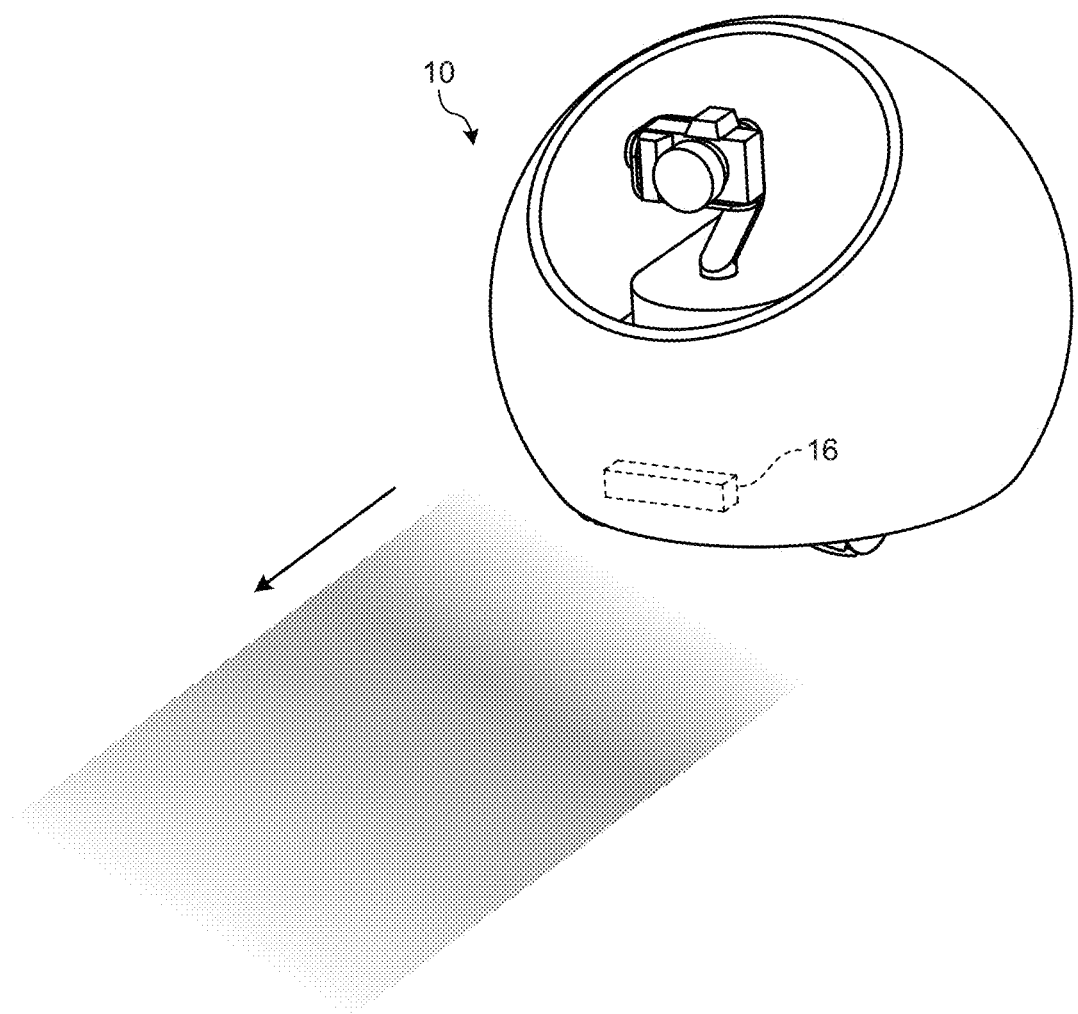
FIG. 19 is a diagram illustrating an example of an illuminating operation.
Figure 20:
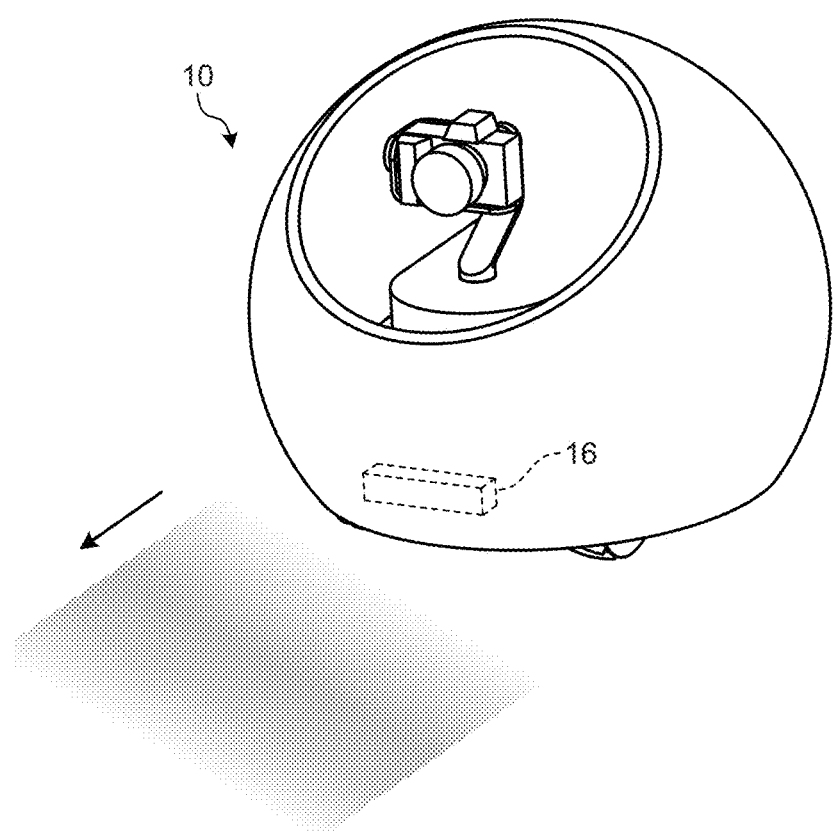
FIG. 20 is a diagram illustrating an example of an illuminating operation.

In examples illustrated in FIG. 19 and FIG. 20, the control unit 19 causes the illumination unit 16 to perform projection corresponding to moving speed of the mobile device 10. Specifically, the illumination unit 16 illuminates a region having an area corresponding to the moving speed of the mobile device 10 and performs projection. As illustrated in FIG. 19, when the mobile device 10 is moving forward at relatively high speed, a region having a relatively large area along a moving direction is illuminated. As illustrated in FIG. 20, when the mobile device 10 is moving forward at relatively slow speed, a region having a relatively small area along the moving direction is illuminated.

Figure 21:
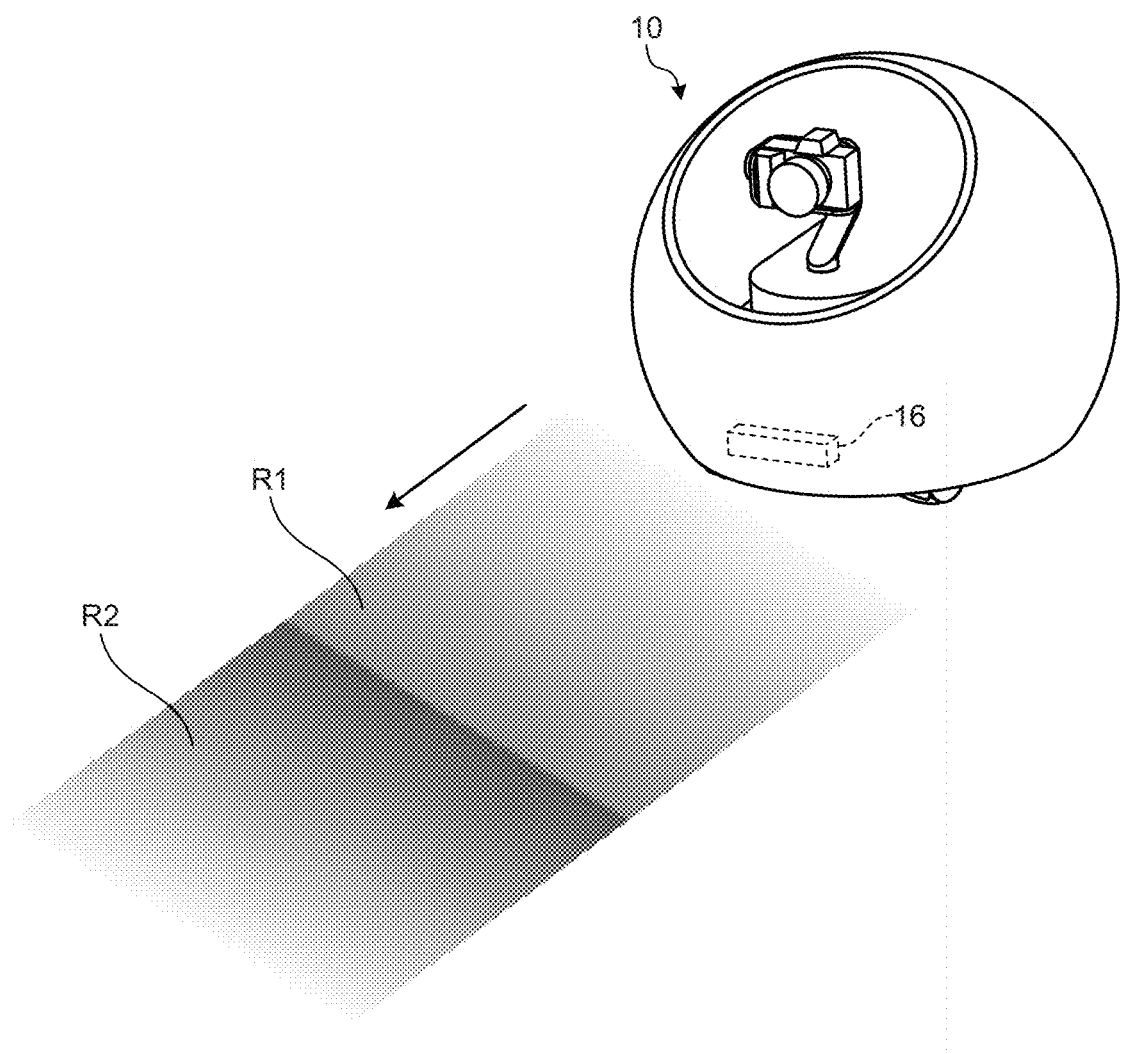
FIG. 21 is a diagram illustrating an example of an illuminating operation.
Figure 22:
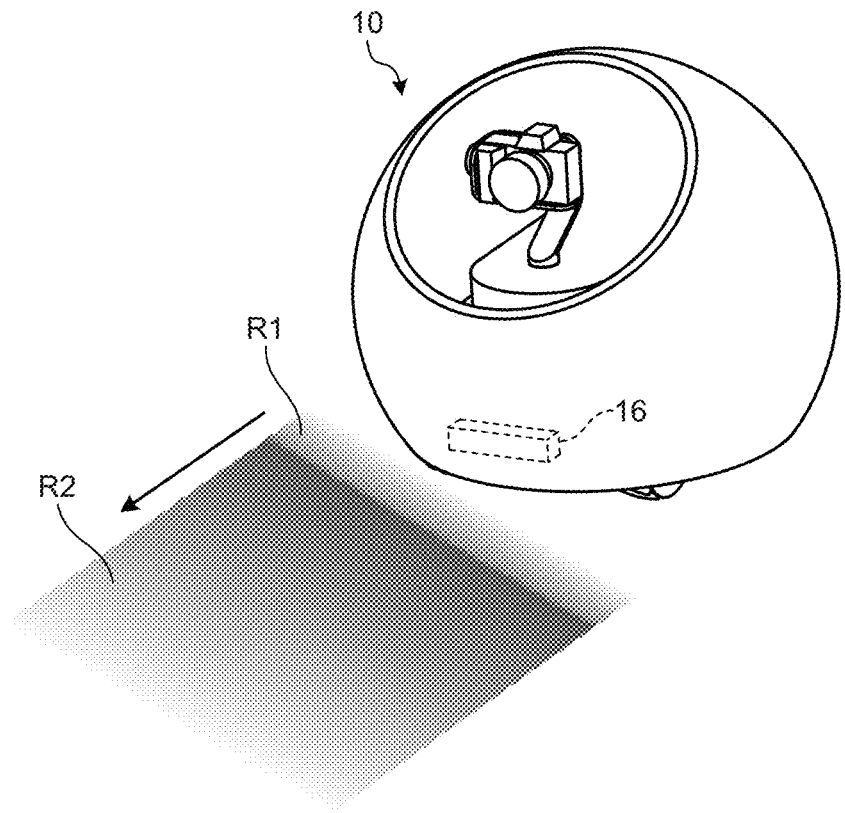
FIG. 22 is a diagram illustrating an example of an illuminating operation.

In examples illustrated in FIG. 21 and FIG. 22, the control unit 19 causes the illumination unit 16 to perform color-coded projection. Specifically, the illumination unit 16 illuminates a region R1 in the vicinity of the mobile device 10 and a region R2 on the opposite side of the mobile device 10 across the region R1 in different colors. For example, the region R1 indicates a photographing zone that is a range to be imaged and the region R2 indicates a movement zone that is a movable range not to be imaged. The sizes of the region R1 and the region R2 are determined according to the imaging operation or the like of the mobile device 10.

The illuminating operation is not only performed together with the movement and the imaging of the mobile device 10 but may be incorporated in performance. The photographing plan for defining the illuminating operation may also be set using, for example, the UI unit 32 that displays a map.

Note that at least a part of the photographing plan may be automatically set. For example, a plurality of combinations of moving operations (virtual routes or the like) and imaging operations (compositions of imaging or the like) may be registered in advance and a photographing plan for sequentially executing the combinations in a predetermined period may be automatically generated. Without being limited to the moving operation and the imaging operation, predetermined operations (default operations) may be automatically incorporated in the photographing plan for various operations. Combinations of a plurality of default operations may be automatically incorporated in the photographing plan. Before and after an operation set by the user, an operation connected to the operation may be automatically incorporated in the photographing plan.

1.5 Example of Processing

Figure 23:
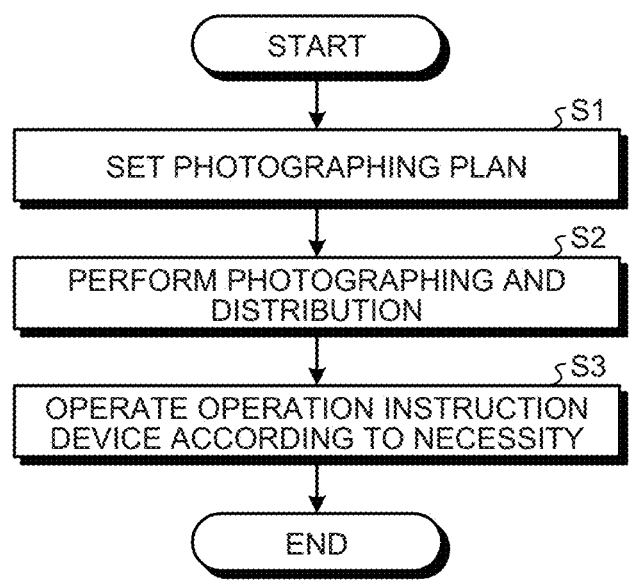
FIG. 23 is a flowchart illustrating an example of processing (a mobile device control method) executed in the imaging system.

FIG. 23 is a flowchart illustrating an example of processing (a method of controlling the mobile device) executed in the imaging system.

In step S1, a photographing plan is set. As explained above, the photographing plan may be set by the user or may be automatically set. The set imaging plan is transmitted to the mobile device 10.

In step S2, photographing and distribution are performed. The control unit 19 controls the operation of the mobile device 10 based on the photographing plan set in step S1 explained above. For example, the mobile device 10 is controlled such that the mobile device 10 moves and the sensor 14 images the performer 5 recognized by the sensor 14 and the light emitting unit 15 performs light emission expression. A video is transmitted and distributed to the operation instruction device 30.

In step S3, the operation instruction device is operated according to necessity. For example, the user updates the photographing plan or manually operates the mobile device 10 using the UI unit 32. Consequently, it is possible to cause the mobile device 10 to perform an operation that is not defined by the photographing plan set in the earlier step S1.

For example, the mobile device 10 is controlled as explained above.

1.6 Example of an External Appearance of a Mobile Device

Figure 24:
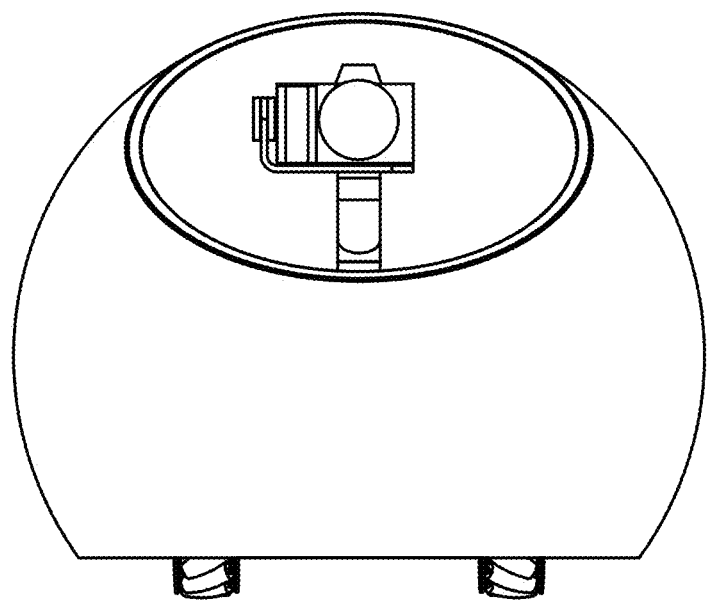
FIG. 24 is a front view illustrating an example of an external appearance of the mobile device when viewed from the front.
Figure 25:
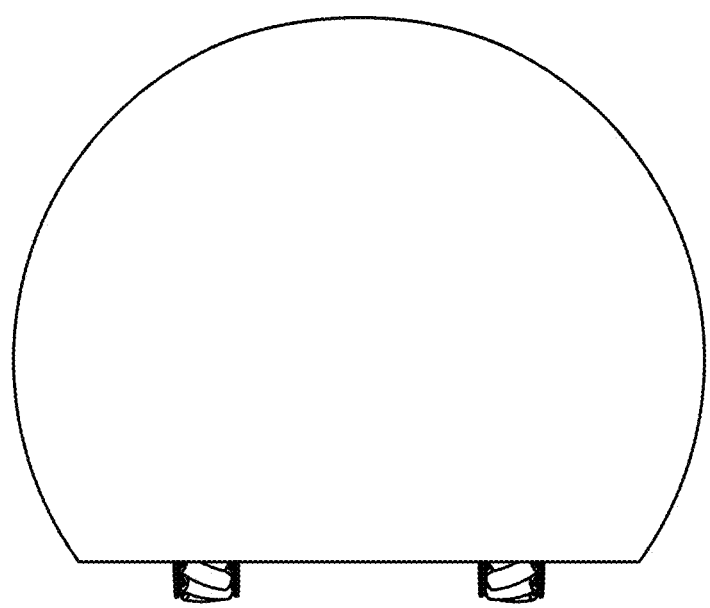
FIG. 25 is a rear view illustrating an example of an external appearance of the mobile device when viewed from the rear.
Figure 26:
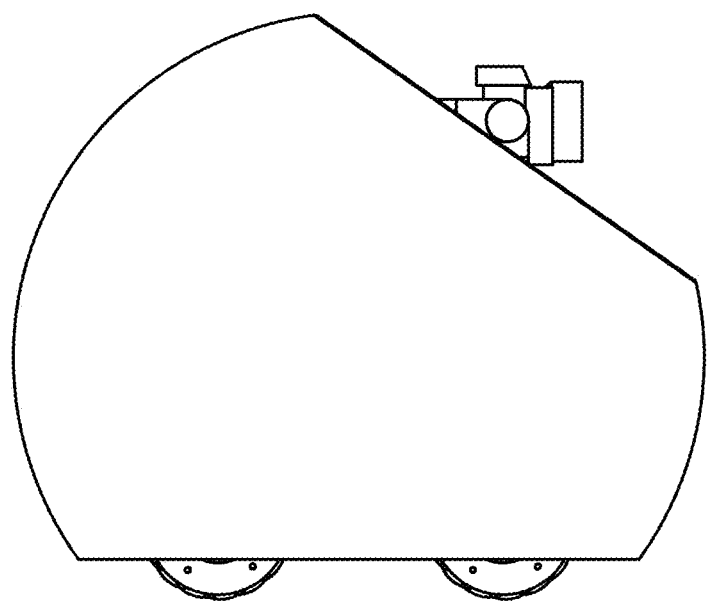
FIG. 26 is a right side view illustrating an example of an external appearance of the mobile device when viewed from the right side.
Figure 27:
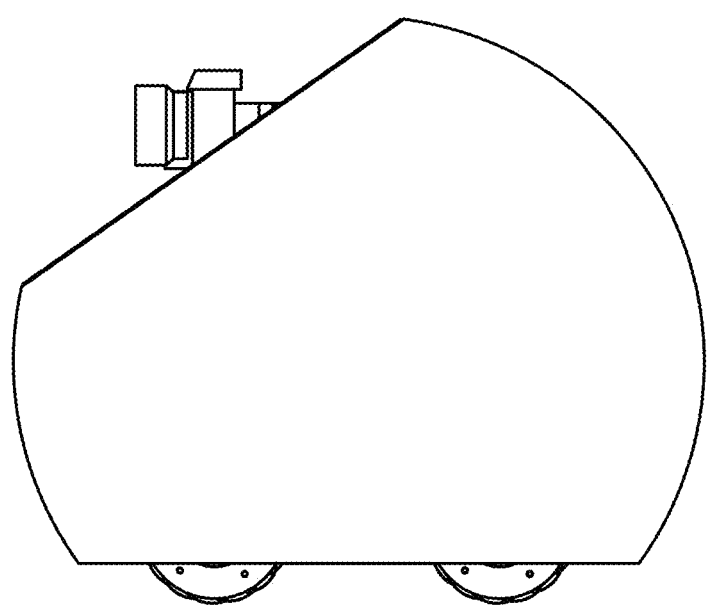
FIG. 27 is a left side view illustrating an example of an external appearance of the mobile device when viewed from the left side.
Figure 28:
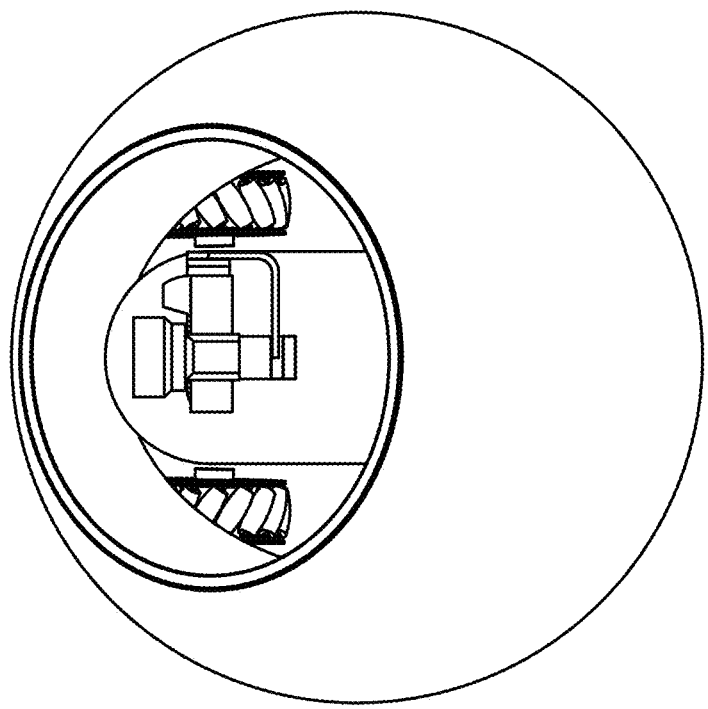
FIG. 28 is a plan view illustrating an example of an external appearance of the mobile device when viewed from the top.
Figure 29:
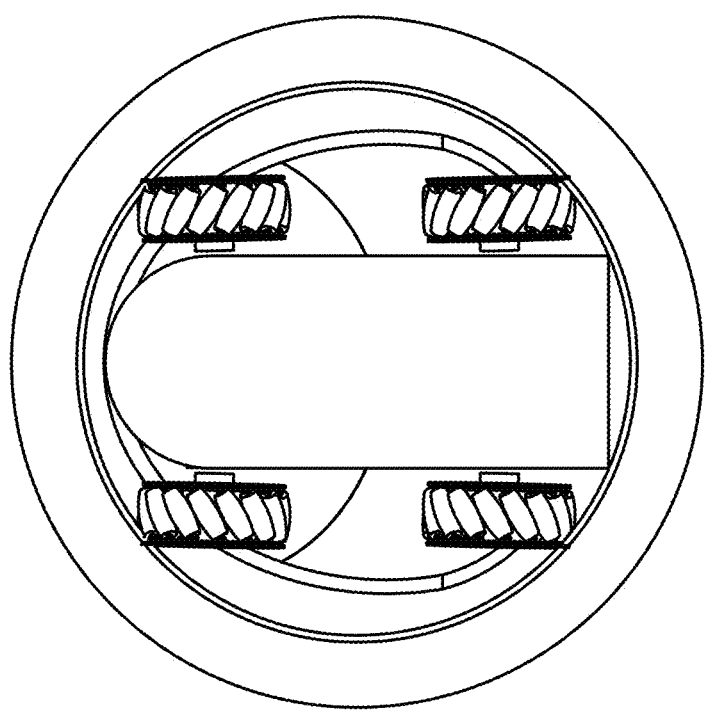
FIG. 29 is a bottom view illustrating an example of an external appearance of the mobile device when viewed from the bottom.

Examples of external appearances of the mobile device 10 are illustrated in FIG. 24 to FIG. 29. Reference numerals are not illustrated. FIG. 24 is a front view illustrating an example of an external appearance of the mobile device when viewed from the front. When viewed from the front, the mobile device has, for example, height of approximately 480 mm and width of approximately 650 mm. FIG. 25 is a rear view illustrating an example of an external appearance of the mobile device when viewed from the rear. FIG. 26 is a right side view illustrating an example of an external appearance of the mobile device when viewed from the right side. FIG. 27 is a left side view illustrating an example of an external appearance of the mobile device when viewed from the left side. FIG. 28 is a plan view illustrating an example of an external appearance of the mobile device when viewed from the top. FIG. 29 is a bottom view illustrating an example of an external appearance of the mobile device when viewed from the bottom.

In the above explanation, an example is explained in which the mobile device has an external shape close to a spherical shape. However, the mobile device may have various shapes other than the spherical shape. An example of the other shapes is explained with reference to FIG. 30 to FIG. 37.

Figure 30:
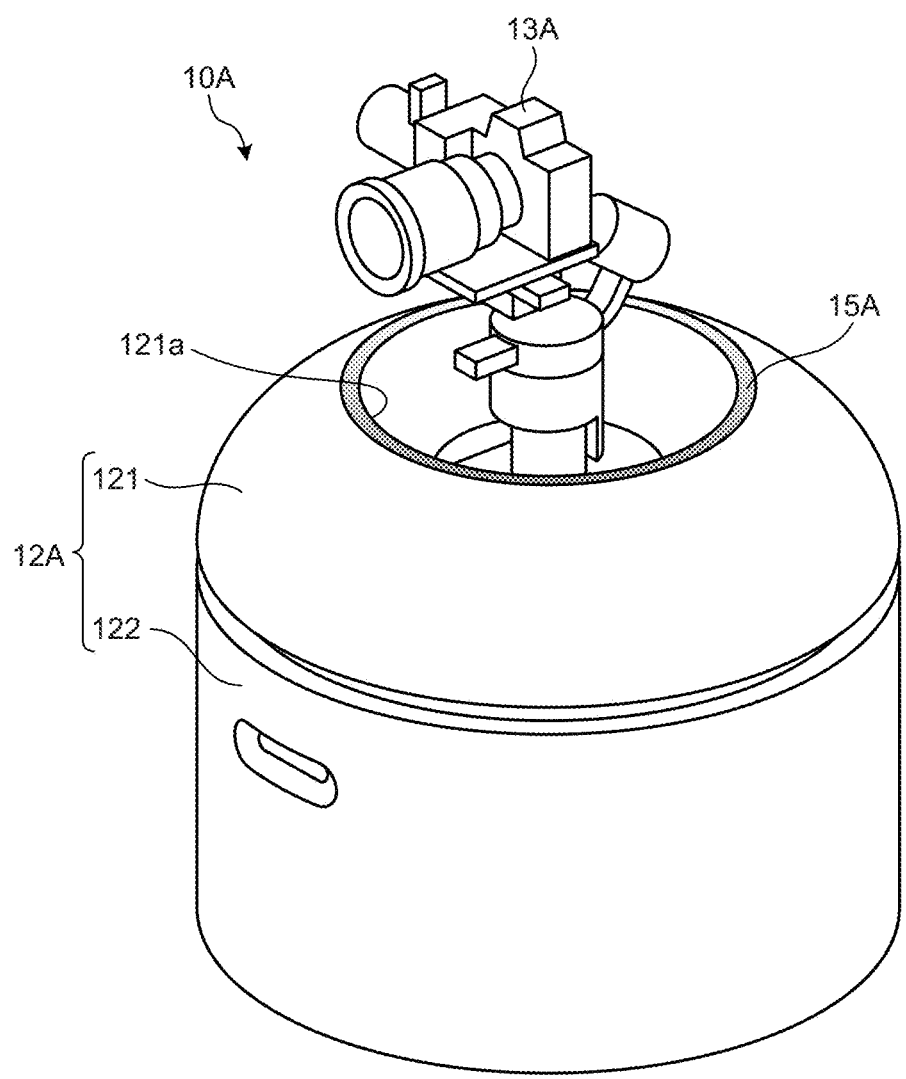
FIG. 30 is a diagram illustrating an example of a schematic configuration of a mobile device.

FIG. 30 is a diagram illustrating an example of a schematic configuration of a mobile device. A mobile device 10A illustrated in FIG. 30 has an external shape close to a cylindrical shape. A housing 12A, which is an outer housing, includes an upper housing 121 and a lower housing 122. A gap is provided between the upper housing 121 and the lower housing 122. A sensor (corresponding to the sensor 14 illustrated in FIG. 2) that recognizes a surrounding environment is provided at the same height as the gap. The gap is formed not to disturb recognition by the sensor.

An opening is formed in an upper part of the upper housing 121 such that imaging by the imaging unit 13A is not hindered. The imaging unit 13A may have a configuration similar to the configuration of the imaging unit 13 (FIG. 2). A portion forming the opening (an edge portion of the opening) is referred to as an opening section 121a and illustrated. A light emitting unit 15A is disposed on the opening section 121a. The light emitting unit 15A may have the same configuration as the configuration of the light emitting unit 15 (FIG. 2). In this example, the opening section 121a has a ring shape and the light emitting unit 15A is disposed on the upper housing 121 in a ring shape.

The lower housing 122 has a cylindrical shape. Although not illustrated, the mobile device 10A includes an illumination unit, a moving mechanism (equivalent to the illumination unit 16 and the moving mechanism 17 in FIG. 2), and the like.

Figure 31:
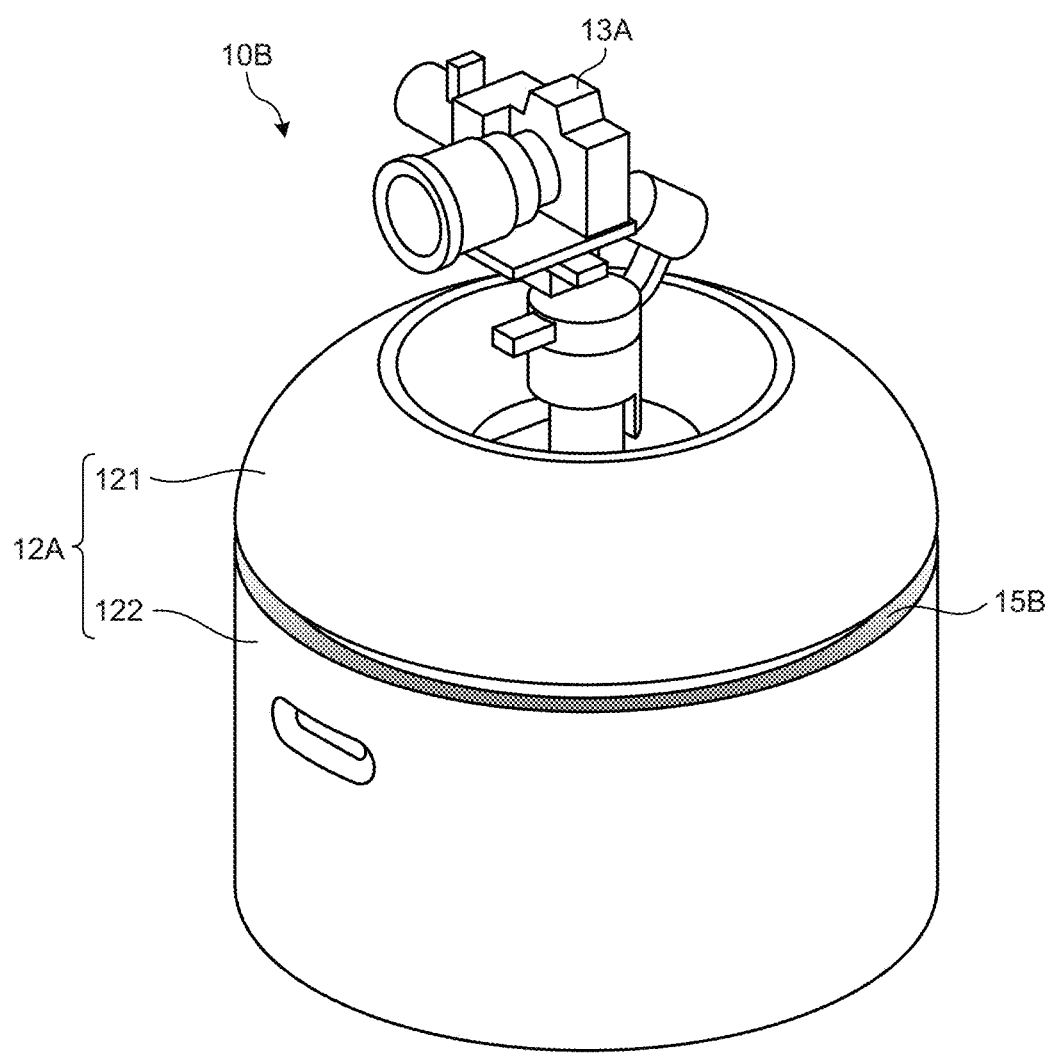
FIG. 31 is a diagram illustrating an example of a schematic configuration of a mobile device.

The mobile device 10B illustrated in FIG. 31 is different compared with the mobile device 10A in that the mobile device 10B includes a light emitting unit 15B instead of the light emitting unit 15A. The light emitting unit 15B is disposed in a ring shape on an upper part of the lower housing 122.

Figure 32:
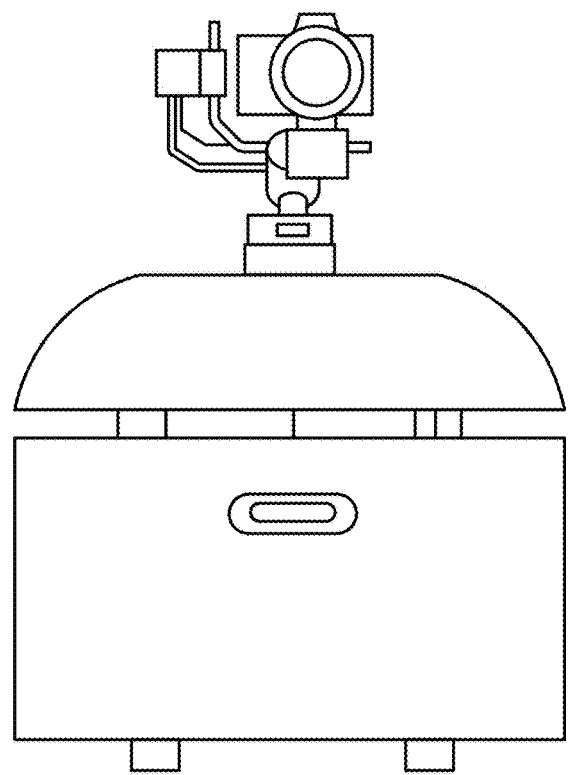
FIG. 32 is a front view illustrating an example of an external appearance of the mobile device when viewed from the front.
Figure 33:
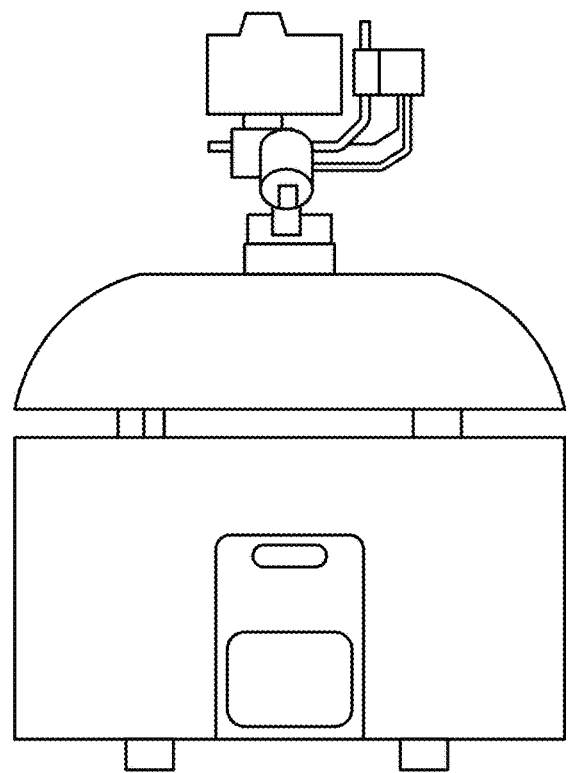
FIG. 33 is a rear view illustrating an example of an external appearance of the mobile device when viewed from the rear.
Figure 34:
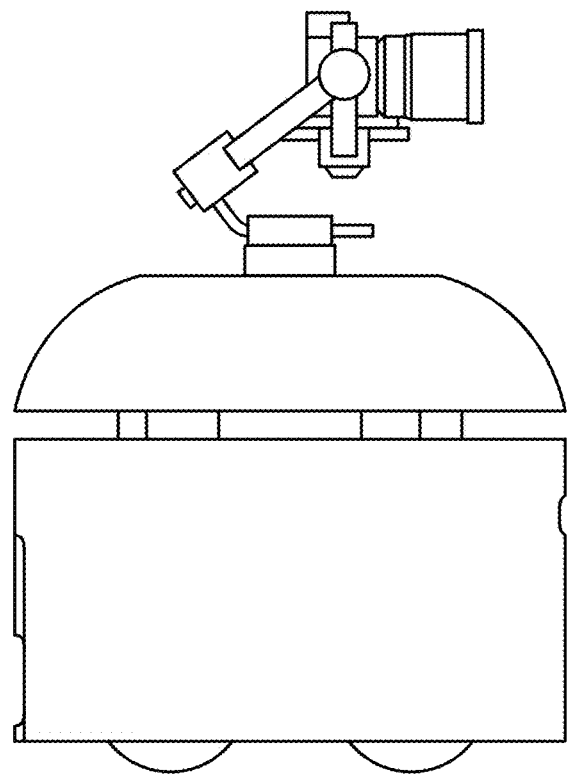
FIG. 34 is a right side view illustrating an example of an external appearance of the mobile device when viewed from the right side.
Figure 35:
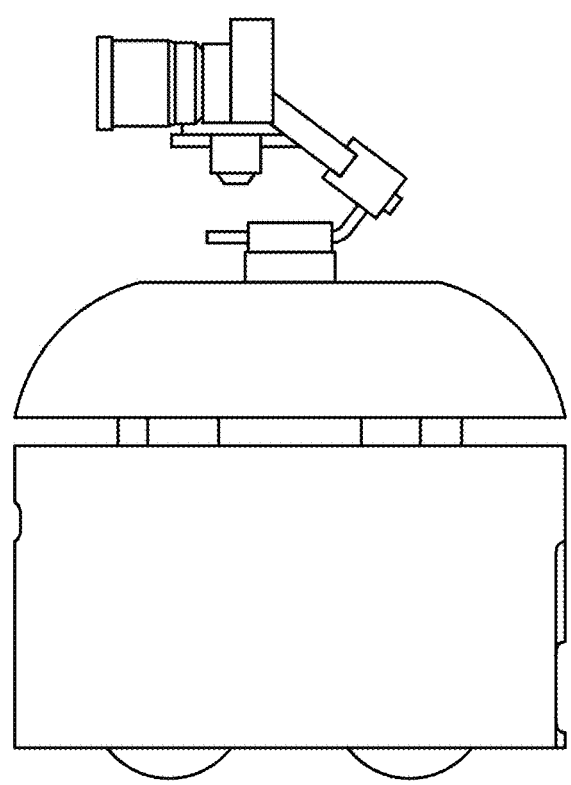
FIG. 35 is a left side view illustrating an example of an external appearance of the mobile device when viewed from the left side.
Figure 36:
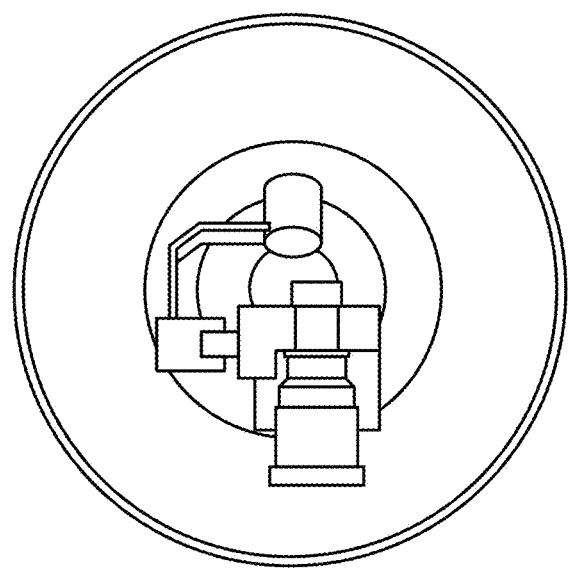
FIG. 36 is a plan view illustrating an example of an external appearance of the mobile device when viewed from the top.
Figure 37:
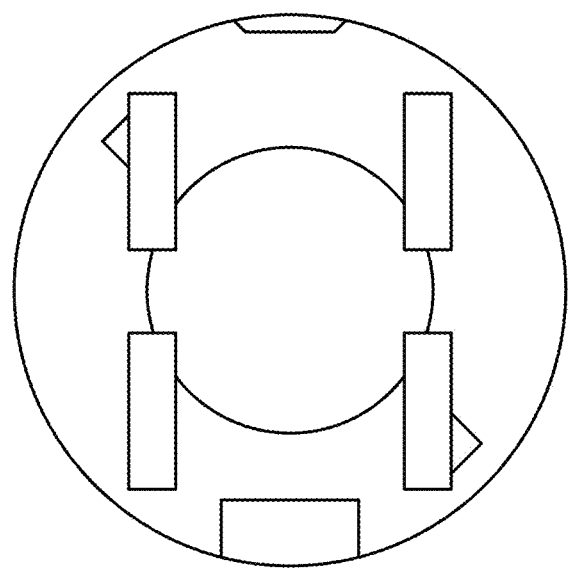
FIG. 37 is a bottom view illustrating an example of an external appearance of the mobile device when viewed from the bottom.

Examples of the external appearances of the mobile devices 10A and 10B are illustrated in FIG. 32 to FIG. 37. Reference numerals are not illustrated. FIG. 32 is a front view illustrating an example of an external appearance of the mobile device when viewed from the front. When viewed from the front, the mobile device has, for example, height of approximately 730 mm (480 mm excluding a portion of a camera) and width of approximately 530 mm. FIG. 33 is a rear view illustrating an example of an external appearance of the mobile device when viewed from the rear. FIG. 34 is a right side view illustrating an example of an external appearance of the mobile device when viewed from the right side. FIG. 35 is a left side view illustrating an example of an external appearance of the mobile device when viewed from the left side. FIG. 36 is a plan view illustrating an example of an external appearance of the mobile device when viewed from the top. FIG. 37 is a bottom view illustrating an example of an external appearance of the mobile device when viewed from the bottom.

Figure 39:
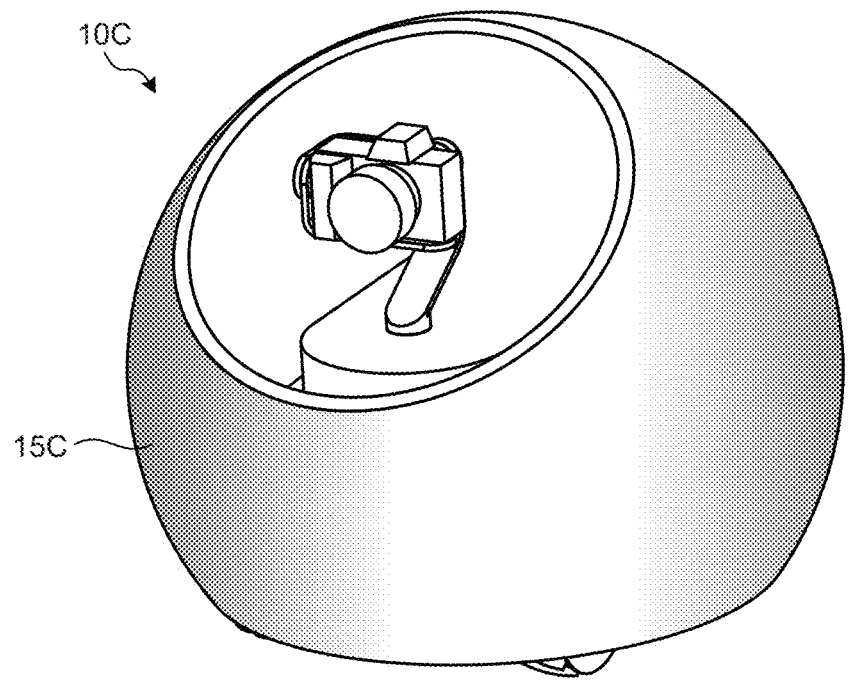
FIG. 39 is a diagram illustrating an example of a light emitting operation.
Figure 40:
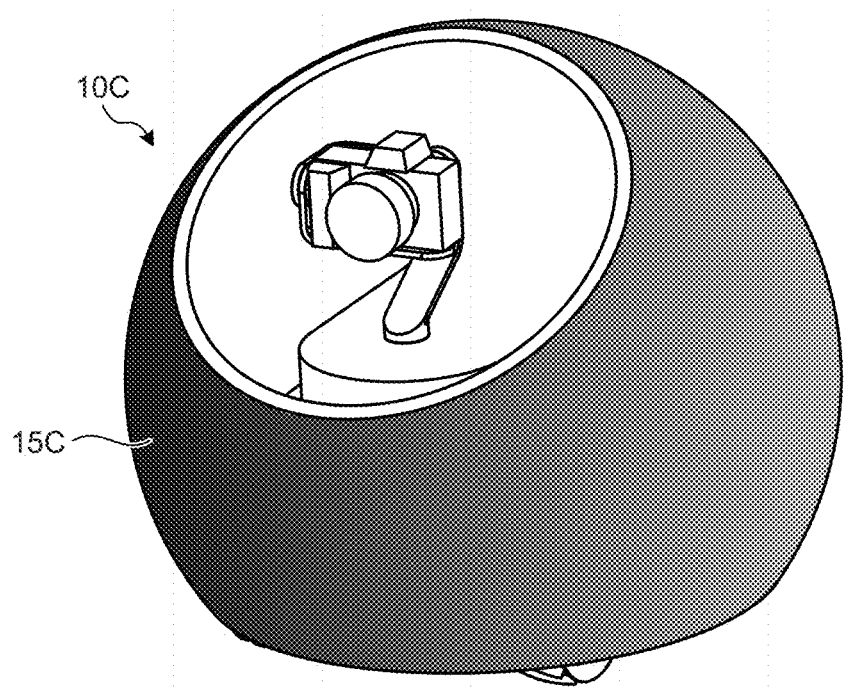
FIG. 40 is a diagram illustrating an example of a light emitting operation.
Figure 41:
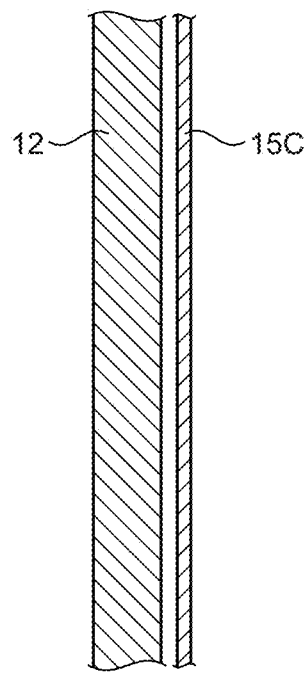
FIG. 41 is a view illustrating an example of a cross section.

The example is explained above in which the light emitting unit is arranged in the ring shape. However, other arrangement is also possible. A mobile device 10C illustrated in FIG. 39 and FIG. 41 is different compared with the mobile device 10 in that the mobile device 10C includes a light emitting unit 15C instead of the light emitting unit 15. The light emitting unit 15 is disposed on the entire surface of the housing 12. The entire surface of the housing 12 may be a surface of a portion of the housing 12 seen from the outside.

An example of an external appearance of the mobile device 10C is similar to the external appearance of the mobile device 10 except the light emitting unit 15C. In the mobile device 1C, a curved LED panel is disposed on the entire surface of the housing 12 to perform surface light emission, whereby a more variety of light emission expressions can be performed. FIG. 41 is a view schematically illustrating a cross section. The curved LED panel is disposed to face the housing 12. The curved LED may be in contact with the housing 12.

Since the curved LED panel disposed on the entire surface of the housing performs the surface light emission, the mobile device 10C can perform light emission expression of the mobile device 10C and can also function as live equipment. More specifically, it is possible to perform character expression such as a color of light emission, a light amount, a mode of flashing, expression by various issuing operations explained above by the color of light emission, the light amount, and the ode of flashing, display of an artist name and a song name, and clock display for the performer 5 or the audience. Since light is emitted in association with a color of illumination of the stage ST, it is possible to cause the mobile device 10 to operate to melt into the stage ST. Specifically, when a blue spotlight is hitting the vicinity of the mobile device 10C, blue light emission expression is performed and, when the illumination of the stage ST is darkened, a black or dark chromatic color is brought out, whereby melting light emission expression can be performed.

As explained above, in the mobile device 10C, compared with when a part (for example, the opening 12a) of the housing 12 functions as the light emitting unit 15 and performs light emission expression as in the mobile device 10, light emission expression is performed using the entire surface of the housing 12 as the light emitting unit 15C, whereby it is possible to perform various light emission expressions that melts into the atmosphere more and is illustrated by the character expression explained above.

1.7 Example of a Hardware Configuration

Figure 38:
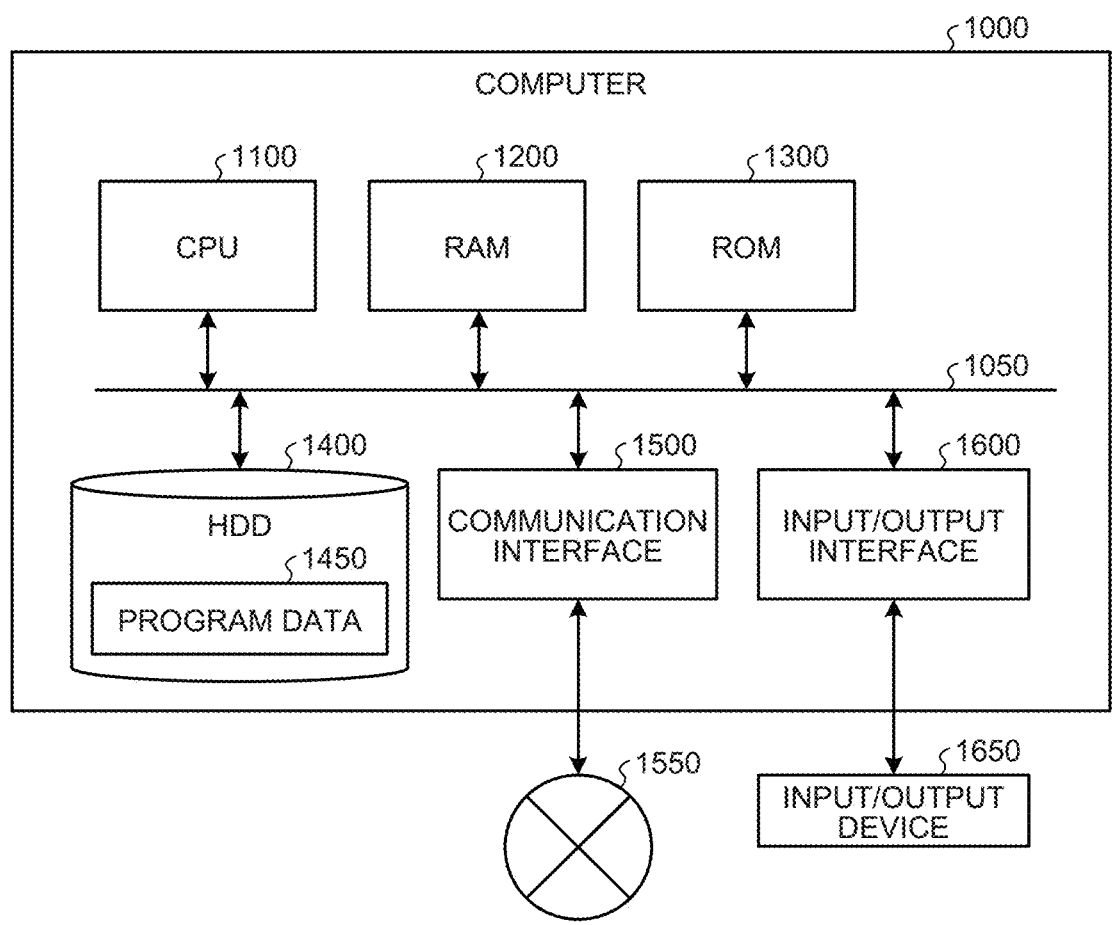

FIG. 38 is a diagram illustrating an example of a hardware configuration of the operation instruction device and the like. For example, the operation instruction device 30 and the control unit 19 of the mobile device 10 are realized by a computer 1000. The computer 1000 includes a CPU 1100, a RAM 1200, a ROM (Read Only Memory) 1300, a HDD (Hard Disk Drive) 1400, a communication interface 1500, and an input/output interface 1600. The units of the computer 1000 are connected by a bus 1050. Note that the control unit 19 of the mobile device 10 may not include the input/output interface 1600. Since the mobile device 10 includes the communication unit 18, the control unit 19 may not include the communication interface 1500.

The CPU 1100 operates based on programs stored in the ROM 1300 or the HDD 1400 and controls the units. For example, the CPU 1100 develops the programs stored in the ROM 1300 or the HDD 1400 in the RAM 1200 and executes processing corresponding to various programs.

The ROM 1300 stores a boot program such as a Basic Input Output System (BIOS) executed by the CPU 1100 at a start time of the computer 1000, a program depending on hardware of the computer 1000, and the like.

The HDD 1400 is a computer-readable recording medium that non-transiently records a program to be executed by the CPU 1100, data used by such a program, and the like. Specifically, the HDD 1400 is a recording medium that records an information processing program according to the present disclosure, which is an example of program data 1450.

The communication interface 1500 is an interface for the computer 1000 to be connected to an external network 1550 (for example, the Internet). For example, the CPU 1100 receives data from other equipment or transmits data generated by the CPU 1100 to the other equipment via the communication interface 1500.

The input/output interface 1600 is an interface for connecting the input/output device 1650 and the computer 1000. For example, the CPU 1100 receives data from an input device such as a keyboard or a mouse via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (medium). The medium is, for example, an optical recording medium such as a VD (Digital Versatile Disc) or a PD (Phase change rewritable Disk), an MO (Magneto-Optical disk), a tape medium, a magnetic recording medium, or a semiconductor memory.

For example, when the computer 1000 functions as the operation instruction device 30, the CPU 1100 of the computer 1000 executes a program loaded on the RAM 1200 to thereby implement the functions of the map generation unit 31, the UI unit 32, the distribution unit 33, and the like. The HDD 1400 stores a program for causing the computer to function as the operation instruction device 30. Note that the CPU 1100 reads the program data 1450 from the HDD 1400 and executes the program data. However, as another example, the CPU 1100 may acquire these programs from another device via the external network 1550.

For example, when the computer 1000 functions as the control unit 19 of the mobile device 10, the CPU 1100 of the computer 1000 executes a program loaded on the RAM 1200 to thereby realize the function of the control unit 19. The HDD 1400 stores a program for causing the computer to function as the control unit 19. Note that the CPU 1100 reads the program data 1450 from the HDD 1400 and executes the program data. However, as another example, the CPU 1100 may acquire these programs from another device via the external network 1550.

Although the embodiment of the present disclosure is explained above, the technical scope of the present disclosure is not limited to the embodiment explained above per se. Various changes are possible without departing from the gist of the present disclosure.

In the embodiment explained above, an example is explained in which the imaging system 1 is used for a music live event. However, a use of the imaging system 1 is not limited to the music live event. For example, the imaging system 1 may be used for various uses such as sports, wedding ceremonies, and monitoring.

In the embodiment explained, an example is explained in which the imaging system 1 includes the mobile devices 10 as many as the performers 5. However, the number of the mobile devices 10 may be different from the number of the performers 5. The number of mobile devices 10 may be one.

In the embodiment explained above, an example is explained in which the environment-side sensor 20 recognizes the tag T to recognize the position of the performer 5. However, the environment-side sensor 20 may recognize the performer 5 without using the tag T. In that case, the imaging system 1 may not include the tag T.

The disposition of the components of the mobile device 10 is not limited to the embodiment explained above. The components may be variously disposed in a range in which the function of the mobile device 10 can be realized. For the same purpose, the external shape of the mobile device 10 is not limited to the embodiment explained above.

2. Effects

The mobile device 10 explained above is specified, for example, as follows. As explained with reference to FIG. 1, FIG. 2, and the like, the mobile device 10 is a mobile device that operates in order to image a subject (the performer 5) and includes the imaging unit 13, the sensor 14 that recognizes the surrounding environment, and the light emitting unit 15 arranged in a ring shape in the housing 12. The operation of the mobile device 10 includes imaging, based on a set imaging plane, with the imaging unit 13, the subject recognized by the sensor 14 as the mobile device 10 moves. The light emitting unit 15 performs light emission expression corresponding to at least one of the photographing plan and the operation of the mobile device 10. As explained with reference to FIG. 39 and the like, the light emitting unit may be the light emitting unit 15C disposed on the entire surface of the housing 12.

With the mobile device 10 explained above, the sensor 14 recognizes the surrounding environment, whereby interaction performance can be improved. For example, by performing movement and imaging while avoiding obstacles, it is possible to perform photographing from various viewpoints in a music event or the like. By performing the light emission expression, the interaction performance can be further improved. The movement of the mobile device 10 does not require large-scale equipment such as a crane and human power and also has an advantage that complicated manual operation is not required.

As explained with reference to FIG. 4 and the like, the photographing plan may include the mobile device 10 moving along the set virtual route. As explained with reference to FIG. 5 and the like, the imaging unit 13 is parameter-controllable. The photographing plan may include changing the parameters of the imaging unit 13 according to the movement of the mobile device 10. As described with reference to FIG. 9 and the like, the photographing plan may include the mobile device 10 tracking and photographing the subject. As explained with reference to FIG. 1, FIG. 7, and the like, the photographing plan may include the mobile device 10 operating according to music. For example, by setting such a photographing plan, it is possible to cause the mobile device 10 to perform various operations.

As explained with reference to FIG. 3 and the like, the mobile device 10 may include the communication unit 18 that transmits an imaging result (a video) of the imaging unit 13 in real time. Consequently, it is possible to perform, for example, live distribution or the like of the video in real time.

As explained with reference to FIG. 11, FIG. 12, and the like, the light emission expression of the light emitting unit 15 may include a change in a light emission color. As described with reference to FIG. 13, FIG. 14, and the like, the light emission expression of the light emitting unit 15 may include a flashing expression. As explained with reference to FIG. 15, FIG. 16, and the like, the light emission representation of the light emitting unit 15 may include a countdown expression. As explained with reference to FIG. 18 and the like, the light emission expression of the light emitting unit 15 may include light emission in cooperation with light emission of the other mobile devices. For example, the interaction performance can be further improved by such various light emission expressions.

As explained with reference to FIG. 2, FIG. 3, FIG. 19 to FIG. 22, and the like, the mobile device 10 may include the illumination unit 16 that performs projection. The illumination unit 16 may perform projection according to at least one of the photographing plan and the operation of the mobile device 10. For example, the interaction performance can be further improved by such various projections.

The imaging system 1 explained with reference to FIG. 1 and FIG. 3 is also an aspect of the present disclosure. That is, the imaging system 1 includes the mobile device 10 that operates in order to photograph a subject (the performer 5) and the operation instruction device 30 that remotely controls the mobile device 10. The mobile device 10 includes the imaging unit 13 and the sensor 14 that recognizes the surrounding environment. The operation of the mobile device 10 includes imaging, based on the set photographing plan, with the imaging unit 13, a subject recognized by the sensor 14 as the mobile device 10 moves. With such an imaging system 1 as well, since the mobile device 10 recognizes the surrounding environment with the sensor 14, the interaction performance can be improved.

As explained with reference to FIG. 3 to FIG. 9 and the like, the photographing plan may define the moving operation and/or the imaging operation of the mobile device 10. For example, by setting such a photographing plan, it is possible to cause the mobile device 10 to perform various moving operations and/or imaging operations.

As explained with reference to FIG. 6 and the like, the operation instruction device 30 may include the user interface (the UI unit 32) for designating a subject. Consequently, the user can manually designate the subject.

As explained with reference to FIG. 1, FIG. 10, and the like, the mobile device 10 may be a plurality of mobile devices 10 that performs an operation in cooperation with one another. Consequently, for example, it is possible to perform photographing and the like at more various viewpoints than when the number of mobile devices 10 is one.

As explained with reference to FIG. 1, FIG. 3, and the like, the imaging system 1 may include the environment-side sensor 20 that recognizes the position of the subject and the mobile device 10 may operate based on a recognition result of the sensor 14 and a recognition result of the operation instruction device 30. Consequently, for example, operation accuracy of the mobile device 10 can be improved compared with when the mobile device 10 operates based on only the recognition result of the sensor 14 of the mobile device 10.

The method of controlling the mobile device 10 explained with reference to FIG. 23 and the like is also an aspect of the present disclosure. That is, the method of controlling the mobile device 10 is a method of controlling the mobile device 10 including the imaging unit 13, the sensor 14 that recognizes the surrounding environment, and the light emitting unit 15 disposed on the housing 12 in a ring shape, the method including controlling the mobile device 10 such that the mobile device 10 moves, a subject (the performer 5) recognized by the sensor 14 is imaged by the imaging unit 13, and the light emitting unit 15 performs light emission expression (step S2). With such a method of controlling the mobile device 10 as well, since the mobile device 10 recognizes the surrounding environment with the sensor 14, the interaction performance can be improved. By performing the light emission expression, the interaction performance can be further improved. As explained with reference to FIG. 39 and the like, the light emitting unit may be the light emitting unit 15C disposed on the entire surface of the housing 12.

The effects described in the present disclosure are only examples and are not limited by the disclosed contents. There may be other effects.

Note that the present technique can also take the following configurations.

(1)
A mobile device that operates in order to photograph a subject, the mobile device comprising:
an imaging unit;
a sensor that recognizes a surrounding environment; and
a light emitting unit disposed on a housing in a ring shape or on an entire surface of the housing, wherein
an operation of the mobile device includes imaging, based on a set photographing plan, with the imaging unit, the subject recognized by the sensor as the mobile device moves, and
the light emitting unit performs a light emission expression corresponding to at least one of the photographing plan and the operation of the mobile device.

(2)
The mobile device according to (1), wherein
the photographing plan includes the mobile device moving along a set virtual route.

(3)
The mobile device according to (1) or (2), wherein
the imaging unit is parameter-controllable, and
the photographing plan includes changing a parameter of the imaging unit according to the movement of the mobile device.

(4)
The mobile device according to any one of (1) to (3), wherein
the photographing plan includes the mobile device tracking and imaging the subject.

(5)
The mobile device according to any one of (1) to (4), wherein
the photographing plan includes the mobile device operating according to music.

(6)
The mobile device according to any one of (1) to (5), comprising
a communication unit that transmits an imaging result of the imaging unit in real time.

(7)
The mobile device according to any one of (1) to (6), wherein
the light emission expression of the light emitting unit includes a change in a light emission color.

(8)
The mobile device according to any one of (1) to (7), wherein
the light emission expression of the light emitting unit includes a flashing expression.

(9)
The mobile device according to any one of (1) to (8), wherein
the light emission expression of the light emitting unit includes a countdown expression.

(10)
The mobile device according to any one of (1) to (9), wherein
the light emission expression of the light emitting unit includes emitting light in cooperation with light emission of another mobile device.

(11)
The mobile device according to (1) to (10), comprising
an illumination unit that performs projection.

(12)
The mobile device according to (11), wherein
the illumination unit performs projection corresponding to at least one of the photographing plan and the operation of the mobile device.

(13)
An imaging system comprising:
a mobile device that operates in order to photograph a subject; and
an operation instruction device that remotely controls the mobile device, wherein
the mobile device includes:
an imaging unit; and
a sensor that recognizes a surrounding environment, and
an operation of the mobile device includes imaging, based on a set photographing plan, with the imaging unit, the subject recognized by the sensor as the mobile device moves.

(14)
The imaging system according to (13), wherein
the photographing plan defines a moving operation of the mobile device.

(15)
The imaging system according to (13) or (14), wherein the photographing plan defines an imaging operation of the mobile device.
(16)
The imaging system according to any one of (13) to (15), wherein
the operation instruction device includes a user interface for designating the subject.
(17)
The imaging system according to any one of (13) to (16), wherein
the mobile device is a plurality of mobile devices that operate in cooperation with one another.
(18)
The imaging system according to any one of (13) to (17), comprising
an environment-side sensor that recognizes a position of the subject, wherein
the mobile device operates based on a recognition result of the sensor and a recognition result of the environment-side sensor.
(19)
A method of controlling a mobile device including an imaging unit, a sensor that recognizes a surrounding environment, and a light emitting unit disposed on a housing in a ring shape or on an entire surface of the housing, the method comprising
controlling the mobile device to image, with the imaging unit, a subject recognized by the sensor as the mobile device moves, and the light emitting unit performs a light emission expression.

REFERENCE SIGNS LIST

1 IMAGING SYSTEM
5 PERFORMER (SUBJECT)
10 MOBILE DEVICE
11 HOUSING
12 HOUSING
13 IMAGING UNIT
14 SENSOR
15 LIGHT EMITTING UNIT
16 ILLUMINATION UNIT
17 MOVING MECHANISM
18 COMMUNICATION UNIT
19 CONTROL UNIT
20 ENVIRONMENT-SIDE SENSOR
21 SENSOR GROUP
22 POSITION INFORMATION ACQUISITION UNIT
23 COMMUNICATION UNIT
30 OPERATION INSTRUCTION DEVICE
31 MAP GENERATION UNIT
32 UI UNIT
33 DISTRIBUTION UNIT
34 COMMUNICATION UNIT

The invention claimed is:

1. A first mobile device, comprising:
a housing;
a sensor configured to recognize a performer in a surrounding environment of the first mobile device;
a communication unit configured to acquire a photographing plan,
wherein the photographing plan is based on at least one of a music known in advance or a performance of the recognized performer known in advance;
an imaging unit configured to execute an imaging operation to image the recognized performer,
wherein the imaging operation is based on the photographing plan and a moving operation of the first mobile device; and
a light emitting unit that is one of
in a ring shape on the housing, or
on an entire surface of the housing,
wherein the light emitting unit is configured to execute a light emission expression corresponding to
the photographing plan that is based on the at least one of the music or the performance of the performer, and
the moving operation of the first mobile device.

2. The first mobile device according to claim 1, wherein the photographing plan includes a movement of the first mobile device along a set virtual route.

3. The first mobile device according to claim 1, wherein the imaging unit is parameter-controllable, and
the photographing plan includes a change of a parameter of the imaging unit based on a movement of the first mobile device.

4. The first mobile device according to claim 1, wherein the photographing plan includes a tracking operation of the first mobile device and the imaging operation.

5. The first mobile device according to claim 1, wherein the photographing plan includes a specific operation of the first mobile device based on the music.

6. The first mobile device according to claim 1, wherein the communication unit is further configured to transmit, in real time, a result of the imaging operation of the imaging unit.

7. The first mobile device according to claim 1, wherein the light emission expression of the light emitting unit includes a change in a light emission color.

8. The first mobile device according to claim 1, wherein the light emission expression of the light emitting unit includes a flashing expression.

9. The first mobile device according to claim 1, wherein the light emission expression of the light emitting unit includes a countdown expression.

10. The first mobile device according to claim 1, wherein the light emission expression of the light emitting unit includes an emission of first light in cooperation with an emission of second light of a second mobile device.

11. The first mobile device according to claim 1, comprising an illumination projector configured to execute a projection operation.

12. The first mobile device according to claim 11, wherein the projection operation corresponds to at least one of the photographing plan or the moving operation of the first mobile device.

13. An imaging system, comprising:
a first mobile device; and
an operation instruction device configured to remotely control the first mobile device, wherein the first mobile device includes:
a sensor configured to recognize a performer in a surrounding environment of the first mobile device;
a communication unit configured to acquire a photographing plan,
wherein the photographing plan is based on at least one of a music known in advance or a performance of the recognized performer known in advance;

an imaging unit configured to execute an imaging operation to image the recognized performer,
  wherein the imaging operation is based on the photographing plan and a moving operation of the first mobile device; and
a light emitting unit configured to execute a light emission expression corresponding to
  the photographing plan that is based on the at least one of the music or the performance of the performer, and
  the moving operation of the first mobile device.

14. The imaging system according to claim 13, wherein the photographing plan defines the moving operation of the first mobile device.

15. The imaging system according to claim 13, wherein the photographing plan defines the imaging operation of the first mobile device.

16. The imaging system according to claim 13, wherein the operation instruction device includes a user interface configured to designate the performer.

17. The imaging system according to claim 13, wherein the first mobile device is configured to operate in cooperation with a plurality of second mobile devices.

18. The imaging system according to claim 13, further comprising an environment-side sensor configured to recognize a position of the recognized performer,
wherein the first mobile device is configured to operate based on the recognized position.

19. A method, comprising:
a mobile device including a communication unit, a housing, an imaging unit, a sensor, and a light emitting unit that is one of in a ring shape on the housing or on an entire surface of the housing:
  recognizing, by the sensor, a performer in a surrounding environment of the mobile device;
  acquiring a photographing plan by the communication unit,
    wherein the photographing plan is based on at least one of a music known in advance or a performance of the recognized performer known in advance;
  executing, by the imaging unit, an imaging operation to image the recognized performer,
    wherein the imaging operation is based on the photographing plan and a moving operation of the mobile device; and
executing, by the light emitting unit, a light emission expression corresponding to
  the photographing plan that is based on the at least one of the music or the performance of the performer, and
  the moving operation of the mobile device.

* * * * *